US012607525B2

(12) United States Patent
Kinjo

(10) Patent No.: US 12,607,525 B2
(45) Date of Patent: Apr. 21, 2026

(54) FORCE SENSOR WITH CROSSTALK REDUCTION

(71) Applicant: Japan Display Inc., Tokyo (JP)

(72) Inventor: Hiroumi Kinjo, Tokyo (JP)

(73) Assignee: Japan Display Inc., Tokyo (JP)

( * ) Notice: Subject to any disclaimer, the term of this patent is extended or adjusted under 35 U.S.C. 154(b) by 632 days.

(21) Appl. No.: 18/099,025

(22) Filed: Jan. 19, 2023

(65) Prior Publication Data

US 2023/0236078 A1     Jul. 27, 2023

(30) Foreign Application Priority Data

Jan. 26, 2022     (JP) ................................. 2022-010282

(51) Int. Cl.
G01L 1/22          (2006.01)

(52) U.S. Cl.
CPC .................................. G01L 1/2293 (2013.01)

(58) Field of Classification Search
None
See application file for complete search history.

(56) References Cited

U.S. PATENT DOCUMENTS

| | | | | |
|---|---|---|---|---|
| 9,024,910 B2 * | 5/2015 | Stephanou | ............ | G06F 3/0414 |
| | | | | 345/173 |
| 10,620,064 B2 * | 4/2020 | Nada | ....................... | G01L 1/205 |
| 2007/0023853 A1 * | 2/2007 | Partain | ...................... | G01T 1/24 |
| | | | | 257/443 |
| 2018/0011601 A1 * | 1/2018 | Kurasawa | .......... | G06V 40/1329 |
| 2018/0090515 A1 * | 3/2018 | Sasaki | ................... | G02F 1/1368 |

FOREIGN PATENT DOCUMENTS

JP          2018-044937 A          3/2018

* cited by examiner

*Primary Examiner* — Eric S. McCall
*Assistant Examiner* — Nigel H Plumb
(74) *Attorney, Agent, or Firm* — K&L Gates LLP

(57)          ABSTRACT

A force sensor includes an array substrate having a first surface provided with a plurality of array electrodes, a counter substrate having an opposite surface facing the first surface, a guard electrode disposed on the first surface and extending between the array electrodes, a sensor layer made of a conductive elastomer and placed over the first surface, the array electrodes, and the guard electrode, and a common electrode provided on the opposite surface. The array substrate and the guard electrode are equipotential.

15 Claims, 22 Drawing Sheets

FORCE SENSOR WITH CROSSTALK REDUCTION

CROSS-REFERENCE TO RELATED APPLICATION

This application claims the benefit of priority from Japanese Patent Application No. 2022-010282 filed on Jan. 26, 2022, the entire contents of which are incorporated herein by reference.

BACKGROUND

1. Technical Field

The present disclosure relates to a force sensor.

2. Description of the Related Art

A force sensor includes an array substrate provided with a plurality of array electrodes, and a counter substrate facing the array electrodes and supporting a common electrode. The counter substrate is a base material to which force is input, and is also called a protective film. A sensor layer covering the common electrode is provided on a surface of the counter substrate, the surface facing the array electrodes. In Japanese Patent Application Laid-open Publication No. 2018-44937 (JP-A-2018-44937), the sensor layer is a conductive elastomer as a mixture of a rubber material that is an insulator with a conductive material. The electric resistance of the conductive elastomer decreases when the conductive elastomer deforms. In JP-A-2018-44937, the sensor layer is separated from the array substrate when no force is input to the counter substrate. The sensor layer contacts the array electrodes when force is input to the counter substrate. Accordingly, the sensor layer is electrically coupled to the array electrodes, and current from the common electrode flows to the array electrodes.

Recently, it has been discussed to provide a sensor layer on an array electrode in order to simplify a manufacturing process and improve the accuracy of bonding a counter substrate to the array substrate. However, when the sensor layer is provided on the array electrode, current flows in the direction of a plane parallel to the sensor layer and crosstalk occurs. To prevent such crosstalk, an anisotropic conductive film in which current flows only in the thickness direction of the sensor layer can be used as the sensor layer, but it is preferred to use a conductive elastomer as the sensor layer when a dynamic range is taken into consideration.

The present disclosure is intended to provide a force sensor in which a sensor layer is provided on an array substrate and that can prevent crosstalk.

SUMMARY

A force sensor according to an embodiment of the present disclosure includes an array substrate having a first surface provided with a plurality of array electrodes, a counter substrate having an opposite surface facing the first surface, a guard electrode disposed on the first surface and extending between the array electrodes, a sensor layer made of a conductive elastomer and placed over the first surface, the array electrodes, and the guard electrode, and a common electrode provided on the opposite surface. The array substrate and the guard electrode are equipotential.

DETAILED DESCRIPTION

Aspects (embodiments) of a force sensor of the present disclosure will be described below in detail with reference to the accompanying drawings. Contents described below in the embodiments do not limit the disclosure of the present disclosure. Constituent components described below include those that could be easily thought of by the skilled person in the art and those identical in effect. Constituent components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and the drawings, any constituent component same as that already described with reference to an already described drawing is denoted by the same reference sign, and detailed description thereof is omitted as appropriate in some cases.

In the present specification and the claims, an expression with "on" in description of an aspect in which one structural body is disposed on another structural body includes both a case in which the one structural body is directly disposed on the other structural body in contact and a case in which the one structural body is disposed above the other structural body with still another structural body interposed therebetween, unless otherwise stated in particular.

First Embodiment

Figure 1:
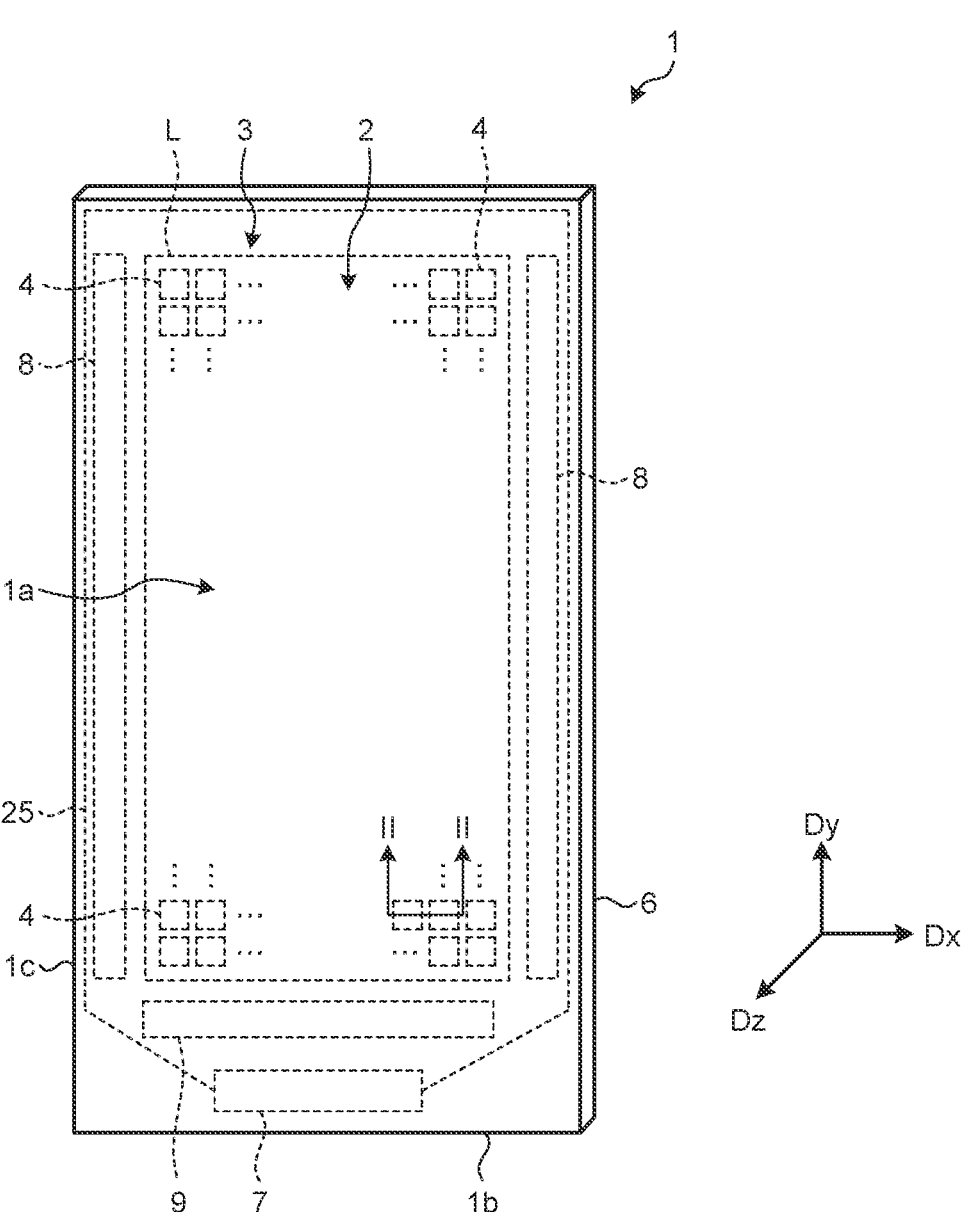
FIG. 1 is a perspective view schematically illustrating a force sensor according to a first embodiment.

FIG. 1 is a perspective view schematically illustrating a force sensor according to a first embodiment. As illustrated in FIG. 1, this force sensor 1 is a device having a plate shape. One surface of the force sensor 1 is a detection surface 1*a*. The force sensor 1 has a rectangular shape when viewed in the normal direction of the detection surface 1*a*. The detection surface 1*a* of the force sensor 1 is divided into a detection region 2 in which force applied to the detection surface 1*a* can be detected and a peripheral region 3 surrounding the outside of the detection region 2. In FIG. 1, a boundary line L is illustrated to facilitate understanding of the boundary between the detection region 2 and the peripheral region 3.

The detection region 2 is divided into a plurality of individual detection regions 4. In other words, the detection region 2 is a set of the individual detection regions 4. The individual detection regions 4 are arrayed in a first direction Dx and a second direction Dy. The first direction Dx is parallel to the detection surface 1*a*. The second direction Dy is parallel to the detection surface 1*a* and intersects the first direction Dx. In the present embodiment, the first direction Dx is parallel to a short side 1*b* of the force sensor 1. The second direction Dy is parallel to a long side 1*c* of the force sensor 1. Accordingly, in the present embodiment, the first direction Dx and the second direction Dy are orthogonal to each other. In the following description, a direction (thickness direction of the force sensor 1) orthogonal to the first direction Dx and the second direction Dy is referred to as a third direction Dz.

Figure 2:
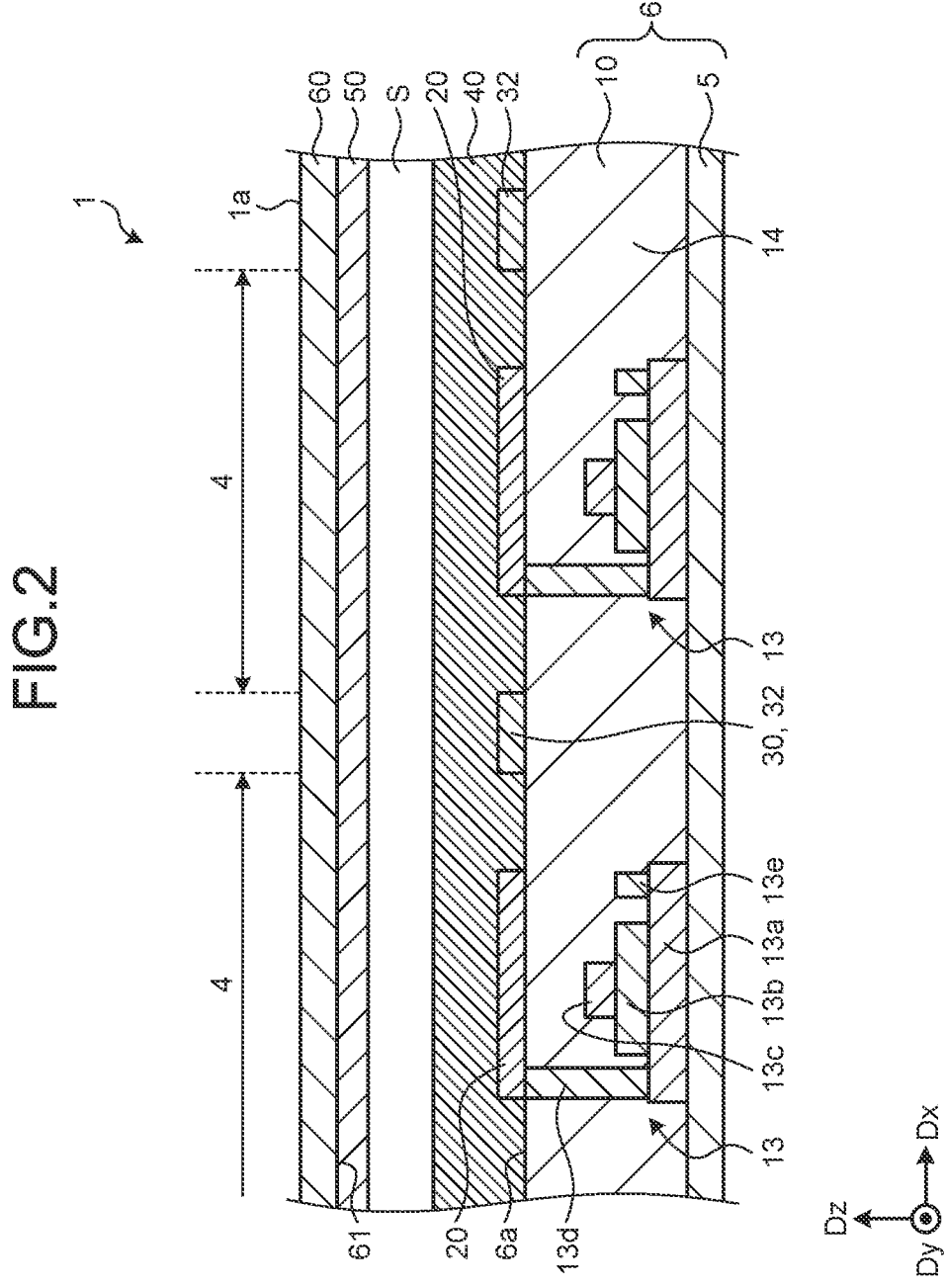
FIG. 2 is a sectional view taken along line II-II in FIG. 1 when viewed in the direction of arrows.
Figure 3:
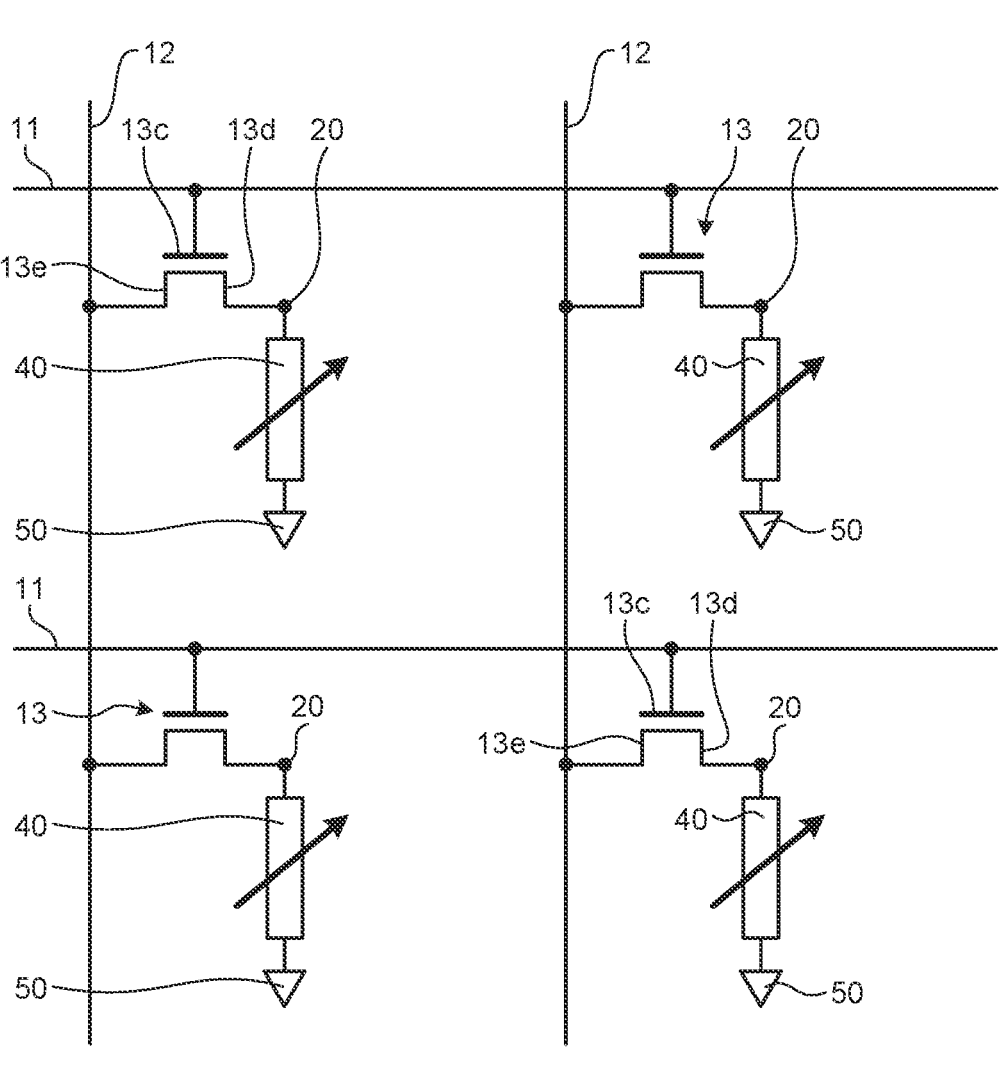
FIG. 3 is a circuit diagram illustrating a circuit configuration of the force sensor of the first embodiment.
Figure 3:
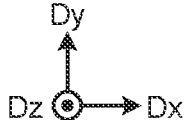

FIG. 2 is a sectional view taken along line II-II in FIG. 1 when viewed in the direction of arrows. FIG. 3 is a circuit diagram illustrating a circuit configuration of the force sensor of the first embodiment. As illustrated in FIG. 2, the force sensor 1 includes a substrate 5, an array layer 10, a guard electrode 30, a sensor layer 40, a common electrode 50, and a protective film 60.

The substrate 5 is an insulating substrate. The substrate 5 is, for example, a glass substrate, a resin substrate, or a resin film. In the following description, an upper side is one side in the third direction Dz and means a side on which the array layer 10 is disposed when viewed from the substrate 5. In addition, a lower side is the other side in the third direction Dz and means a side on which the substrate 5 is disposed when viewed from the array layer 10.

The array layer 10 is provided with a plurality of array electrodes 20. The array electrodes 20 are disposed in the detection region 2 on the array layer 10. In addition, a plurality of drive transistors 13 are provided in the detection region 2 on the array layer 10. The array layer 10 includes various components for driving the drive transistors 13. Specifically, as illustrated in FIG. 1, the array layer 10 includes a coupling part 7, gate line drive circuits 8, a signal line selection circuit 9, gate lines 11 (refer to FIG. 3), and signal lines 12 (refer to FIG. 3). The array layer 10 and the substrate 5 are integrated to form an array substrate 6.

The coupling part 7, the gate line drive circuits 8, and the signal line selection circuit 9 are disposed in the peripheral region 3 on the array layer 10. The coupling part 7 is used to couple with a drive integrated circuit (IC) disposed outside the force sensor 1. In the present disclosure, the drive IC may be mounted as a chip-on film (COF) on a flexible printed board or a rigid substrate coupled with the coupling part 7. Alternatively, the drive IC may be mounted as a chip-on glass (COG) in the peripheral region 3 of the substrate 5.

The gate line drive circuits 8 are circuits configured to drive the gate lines 11 (refer to FIG. 3) based on various kinds of control signals from the drive IC. The gate line drive circuits 8 sequentially or simultaneously select a plurality of gate lines 11 and supply a gate drive signal to the selected gate lines 11. The signal line selection circuit 9 is a switch circuit configured to sequentially or simultaneously select a plurality of signal lines 12 (refer to FIG. 3). The signal line selection circuit 9 is, for example, a multiplexer. The signal line selection circuit 9 couples the selected signal lines 12 to the drive IC based on a selection signal supplied from the drive IC.

FIG. 3 is a circuit diagram illustrating a circuit configuration of the force sensor of the first embodiment. As illustrated in FIG. 3, the gate lines 11 extend in the first direction Dx in the array layer 10. The gate lines 11 are arrayed in the second direction Dy. The signal lines 12 extend in the second direction Dy in the array layer 10. The signal lines 12 are arrayed in the first direction Dx.

One drive transistor 13 is provided in each individual detection region 4. As illustrated in FIG. 2, each drive transistor 13 includes a semiconductor layer 13*a*, a gate insulating film 13*b*, a gate electrode 13*c*, a drain electrode 13*d*, and a source electrode 13*e*. The source electrode 13*e* is electrically coupled to an array electrode 20. The gate electrode 13*c* is coupled to a gate line 11. The drain electrode 13*d* is coupled to a signal line 12. Accordingly, when the gate line 11 is scanned, the array electrode 20 is electrically coupled to the signal line 12. As a result, an electric signal (the value of current) input to the array electrode 20 is obtained through the signal line 12.

In addition, as illustrated in FIG. 1, a common wire 25 and a common electrode wire (not illustrated) are provided in the peripheral region 3 on the array layer 10. The common wire 25 is a wire for supplying predetermined voltage to the common electrode 50 and extends along the peripheral region 3. A guard electrode wire is wiring for supplying predetermined voltage to the guard electrode 30. The common wire 25 and the guard electrode wire (not illustrated) are coupled to the drive IC through the coupling part 7 and supplied with constant voltage from the drive IC.

As illustrated in FIG. 2, in the array substrate 6, a first surface 6a facing the protective film 60 is flattened by an insulating layer 14 covering the drive transistors 13 and the like. In addition, a spacer (not illustrated) supporting the protective film 60 is provided in the peripheral region 3 on the first surface 6a of the array substrate 6.

Figure 4:
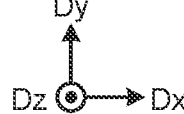
FIG. 4 is a plan view of an array substrate of the first embodiment when viewed from a sensor layer.

FIG. 4 is a plan view of the array substrate of the first embodiment when viewed from the sensor layer. The array electrodes 20 and the guard electrode 30 are provided on the first surface 6a of the array substrate 6. The array electrodes 20 and the guard electrode 30 are made of a metallic material such as indium tin oxide (ITO). As illustrated in FIG. 4, each array electrode 20 has a rectangular shape. The array electrodes 20 are arrayed in the first direction Dx and the second direction Dy and disposed at central parts of the respective individual detection regions 4. The present disclosure is not limited to a configuration in which the shape of each array electrode is rectangular.

As illustrated in FIG. 4, the guard electrode 30 includes a plurality of first guard electrodes 31 extending in the first direction Dx and a plurality of second guard electrodes 32 extending in the second direction Dy. The first guard electrodes 31 are disposed at equal intervals in the first direction Dx. The second guard electrodes 32 are disposed at equal intervals in the second direction Dy. Accordingly, the guard electrode 30 divides the detection region 2 into a matrix of regions. The divided regions of the matrix by the guard electrode 30 correspond to the respective individual detection regions 4. In other words, each array electrode 20 is disposed inside a rectangular frame formed of the first guard electrodes 31 and the second guard electrodes 32.

Although not particularly illustrated, an end part of each first guard electrode 31 in the first direction Dx extends to the peripheral region 3. The end part of each first guard electrode 31 in the first direction Dx is coupled to the guard electrode wire (not illustrated). Similarly, an end part of each second guard electrode 32 in the second direction Dy extends to the peripheral region 3. The end part of each second guard electrode 32 in the second direction Dy is coupled to the guard electrode wire (not illustrated). The first guard electrodes 31 and the second guard electrodes 32 are supplied with constant voltage from the drive IC.

The sensor layer 40 is a conductive elastomer as a mixture of a rubber material (parent material) that is an insulator with a conductive material. The sensor layer 40 has a large resistance value when no force is input. When force is input to the sensor layer 40, fine particles in the rubber material contact or approach each other and the resistance value of the sensor layer 40 decreases. Moreover, as the amount of deformation of the rubber material increases, the number of contacting fine particles increases and the resistance value of the sensor layer 40 significantly decreases.

As illustrated in FIG. 2, the sensor layer 40 is placed over the first surface 6a of the array layer 10, the array electrodes 20, and the guard electrode 30. In other words, the sensor layer 40 is a solid film entirely covering the first surface 6a, the array electrodes 20, and the guard electrode 30. Accordingly, the array electrodes 20 and the guard electrode 30 contact the sensor layer 40. An edge part of the sensor layer 40 extends to the peripheral region 3. The edge part of the sensor layer 40 is fixed to the array layer 10 by a non-illustrated bonding layer or a double-sided adhesive tape. In the present disclosure, the sensor layer 40 may be disposed only in the detection region 2 and does not necessarily need to extend to the peripheral region 3. The sensor layer 40 of the present disclosure may be formed through application onto the first surface 6a of the array layer 10 or the like.

The protective film 60 is a highly insulating and flexible base material. In the present disclosure, the protective film 60 is also called a counter substrate. An edge part of the protective film 60 is fixed to the non-illustrated spacer. Accordingly, the protective film 60 is separated from the array substrate 6 in the third direction Dz. The protective film 60 has an opposite surface 61 facing the array substrate 6, and the detection surface 1a facing in a direction opposite to the opposite surface 61.

The common electrode 50 is a solid electrode deposited on the entire opposite surface 61 of the protective film 60. The common electrode 50 is coupled to the common wire 25 provided in the peripheral region 3 on the first surface 6a of the array substrate 6. The common electrode 50 is separated from the sensor layer 40. In other words, a gap S is provided between the common electrode 50 and the sensor layer 40. Accordingly, the common electrode 50 is insulated from the array electrodes 20.

The following describes a method of using the force sensor 1. Each array electrode 20 is electrically coupled to the guard electrode 30 through the sensor layer 40. When the force sensor 1 is used, voltage at the same potential as the potential of the array electrode 20 is applied to the guard electrode 30 through the guard electrode wire (not illustrated). Accordingly, no current flows from the guard electrode 30 to the array electrode 20. Thus, current is avoided from flowing to the array electrode 20 when no force is input. The potential of the array electrode 20 is the potential of the array electrode 20 in a state in which the gate drive signal is input to the corresponding gate line 11 and the array electrode is coupled to the corresponding signal line 12. Voltage is applied to the common electrode 50 through the common wire 25 (refer to FIG. 1) and the common electrode 50 is at reference potential. The reference potential is higher than the potential of the array electrode 20 and the potential of the guard electrode 30.

Figure 5:
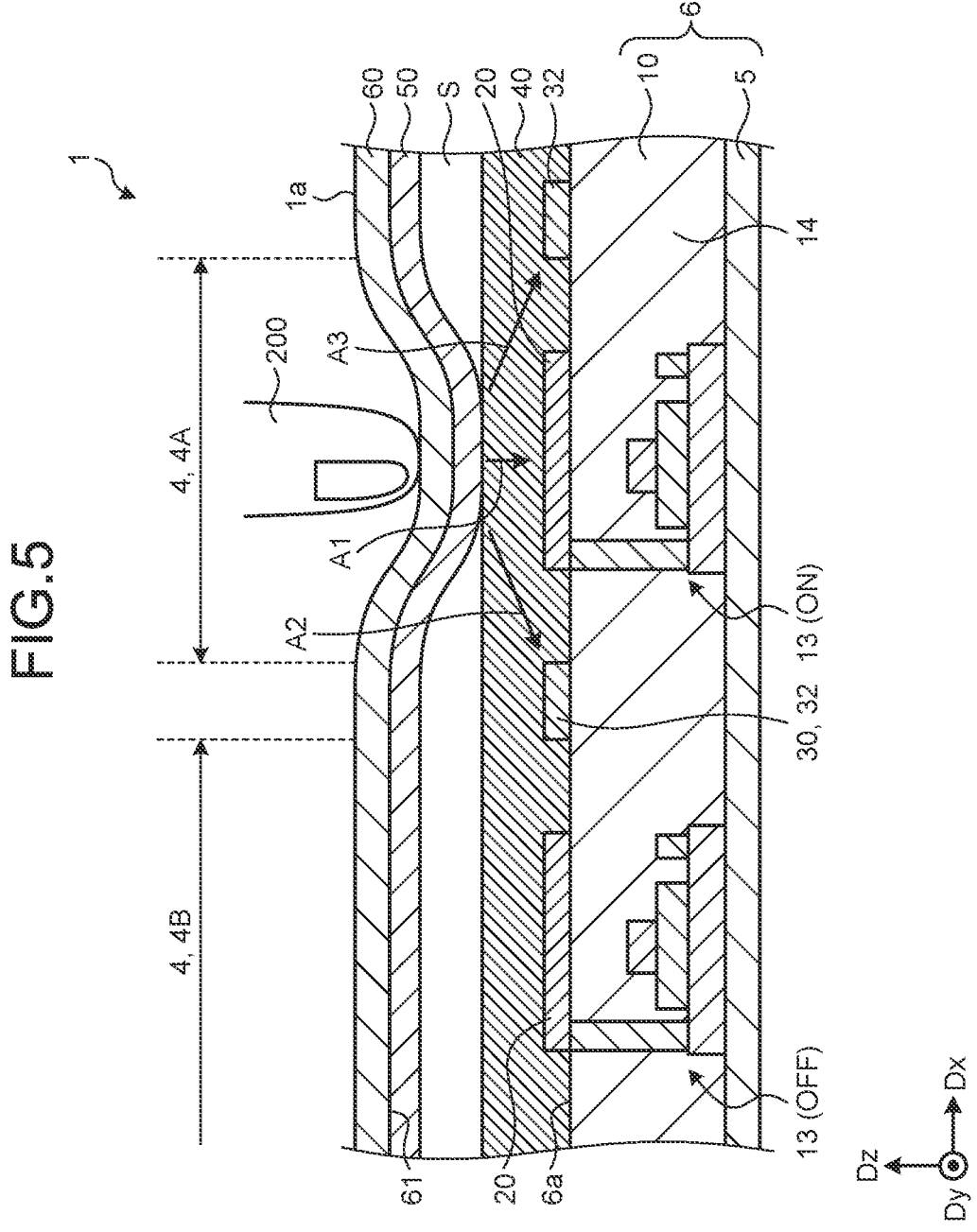
FIG. 5 is a sectional view illustrating a state in which a detection surface of the force sensor of the first embodiment is pressed.
Figure 6:
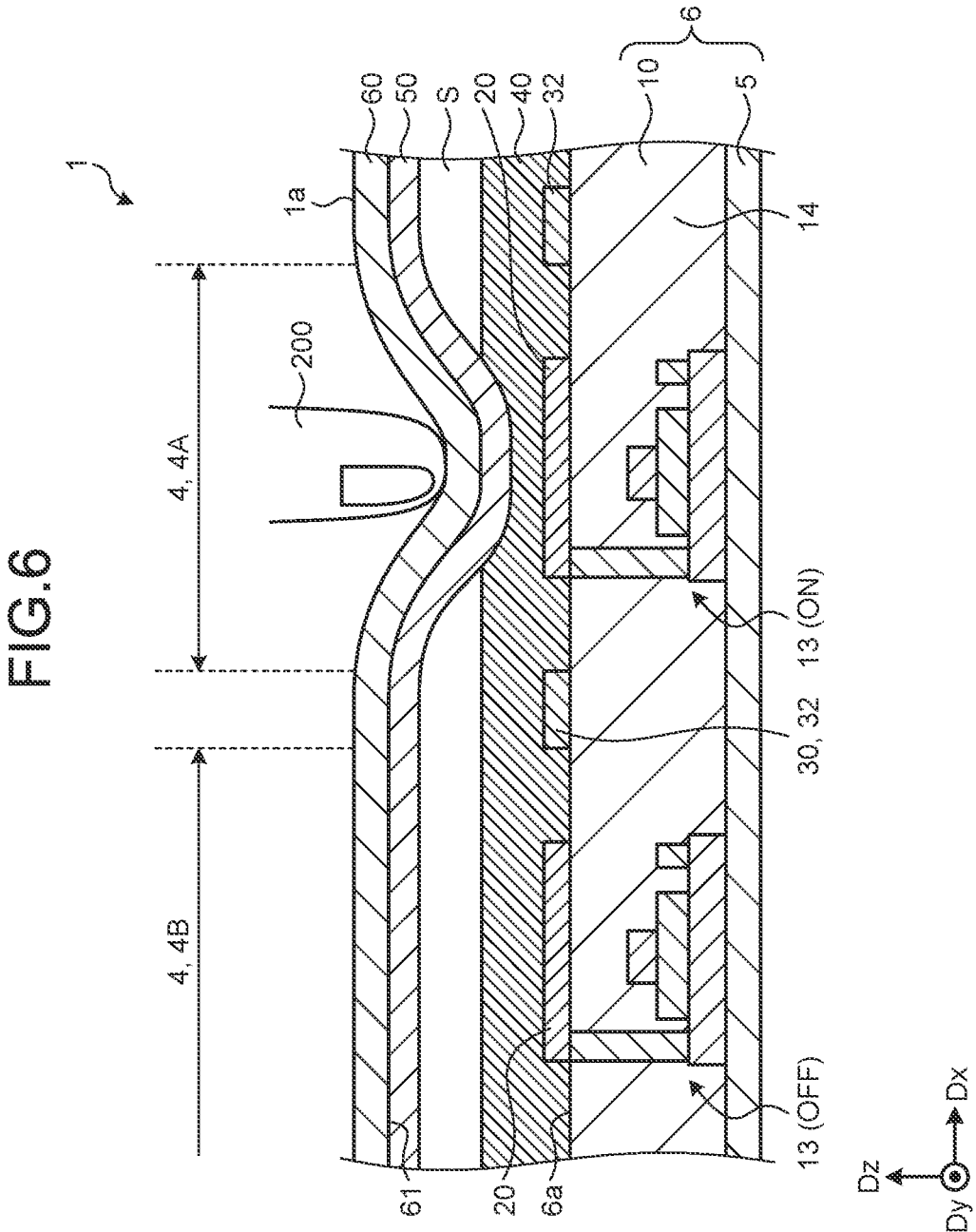
FIG. 6 is a sectional view illustrating a case in which the pressing is performed by a larger force than in the state of FIG. 5.
Figure 7:
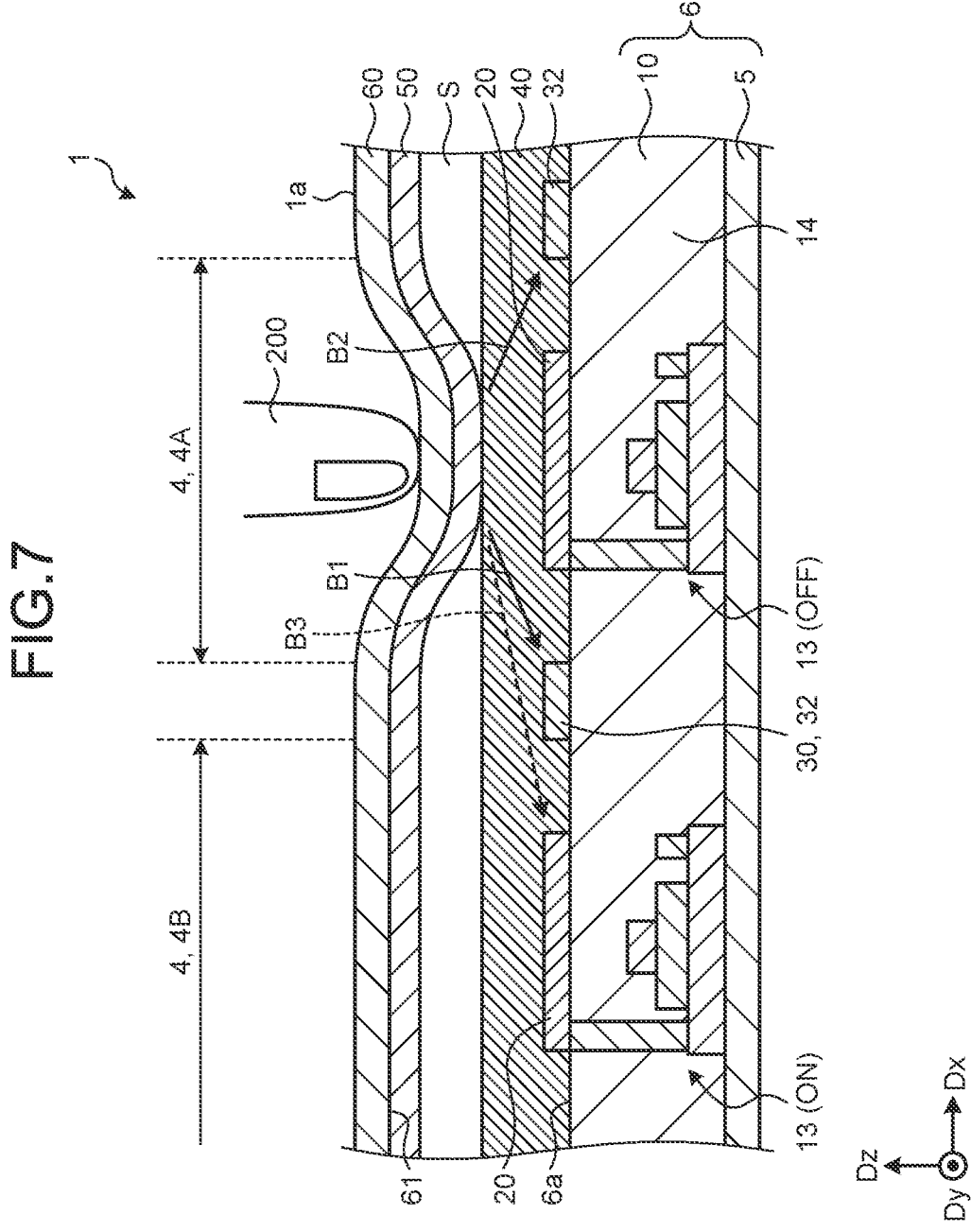
FIG. 7 is a sectional view illustrating a case in which an array electrode in a pressed individual detection region is not coupled to a signal line.

FIG. 5 is a sectional view illustrating a state in which the detection surface of the force sensor of the first embodiment is pressed. FIG. 6 is a sectional view illustrating a case in which the pressing is performed by a larger force than in the state of FIG. 5. FIG. 7 is a sectional view illustrating a case in which an array electrode in a pressed individual detection region is not coupled to a signal line. The following describes a case in which part of the detection surface 1a of the force sensor 1 is pressed. In the following description, a pressed region among the individual detection regions 4 is referred to as a pressed individual detection region 4A, and a region adjacent to the pressed individual detection region 4A is referred to as an adjacent individual detection region 4B.

As illustrated in FIG. 5, when the detection surface 1a of the force sensor 1 is pressed by a finger 200, part of the protective film 60 deforms and protrudes on the lower side. Accordingly, the common electrode 50 contacts the sensor layer 40. The array electrode 20 included in the pressed individual detection region 4A is electrically coupled to the common electrode 50 through the sensor layer 40 when coupled to the corresponding signal line 12 (when the corresponding drive transistor 13 is on). Accordingly, current flows to the array electrode 20 (refer to arrow A1 in FIG. 5). As a result, the value of current input to the array electrode 20 is output from the signal line 12.

The array electrode 20 included in the pressed individual detection region 4A is surrounded by the guard electrode 30 (the first guard electrodes 31 and the second guard electrodes 32). Accordingly, current also flows to the guard electrode 30 included in the pressed individual detection region 4A (refer to arrows A2 and A3 in FIG. 5). As a result, current from the common electrode 50 hardly flows out of the rectangular frame of the guard electrode 30. In other words, no current sufficient to drive as a sensor flows to the array electrode 20 included in the adjacent individual detection region 4B.

When force input to the detection surface 1a of the force sensor 1 is large, the protrusion amount of the protective film 60 on the lower side increases as illustrated in FIG. 6. As a result, the sensor layer 40 deforms and becomes recessed on the lower side and the resistance value of the sensor layer 40 decreases at a deformed part. Moreover, the sectional shape of a contact place of the common electrode 50 and the sensor layer 40 becomes a circular arc shape, which results in contact area increase. Accordingly, the value of current flowing to the array electrode 20 included in the pressed individual detection region 4A and the guard electrode 30 increases.

As illustrated in FIG. 7, when the array electrode 20 in the pressed individual detection region 4A is not coupled to the corresponding signal line 12 (when the corresponding drive transistor 13 is off), current flows to the array electrode 20. However, the guard electrode 30 surrounding the array electrode 20 has a predetermined potential. Accordingly, current flows to the guard electrode 30 (refer to arrows B1 and B2 in FIG. 7).

When the array electrode 20 included in the adjacent individual detection region 4B is coupled to the corresponding signal line 12 (when the corresponding drive transistor 13 is on), current from the common electrode 50 potentially flows through the sensor layer 40 (refer to dashed line arrow B3 in FIG. 7). However, according to the present embodiment, the guard electrode 30 is disposed between the contact place of the common electrode 50 and the sensor layer 40 and the array electrode 20 included in the adjacent individual detection region 4B. With this configuration, current from the common electrode 50 flows to the guard electrode 30 and hardly flows to the array electrode 20 included in the adjacent individual detection region 4B.

As described above, according to the force sensor 1 of the first embodiment, no current flows to the array electrode 20 in the adjacent individual detection region 4B not being pressed. Accordingly, crosstalk is avoided.

Figure 8:
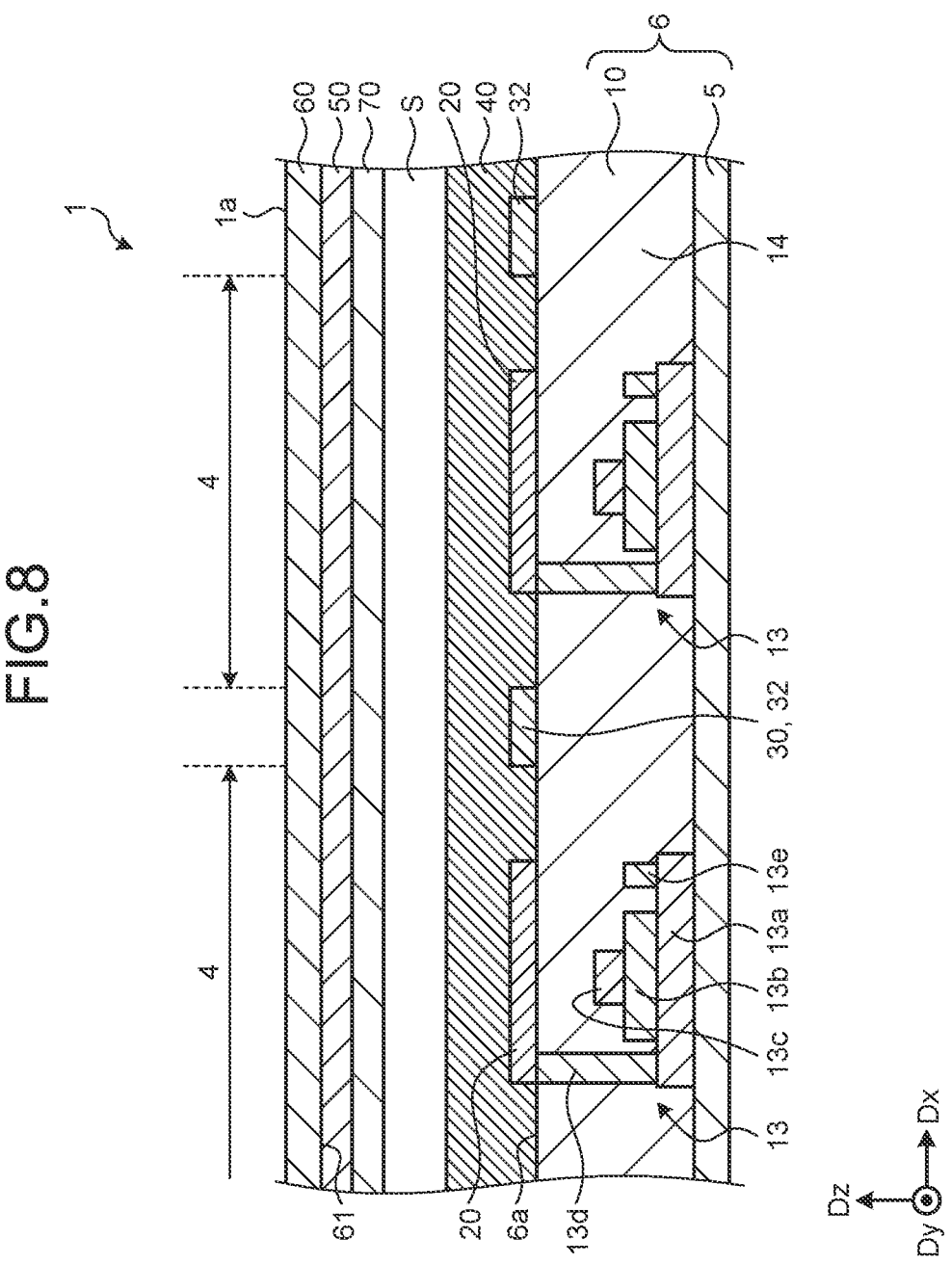
FIG. 8 is a sectional view of a modification of the force sensor of the first embodiment.

FIG. 8 is a sectional view of a modification of the force sensor of the first embodiment. The force sensor 1 of the first embodiment is described above, but the force sensor of the present disclosure is not limited to a configuration in which only the sensor layer 40 is provided on the array substrate 6. As illustrated in FIG. 8, in the force sensor 1, an opposite-side sensor layer 70 may be provided on the opposite surface 61 of the protective film 60. The opposite-side sensor layer 70 is a solid film covering the opposite surface 61 and the common electrode 50. According to a modification as well, crosstalk can be prevented as in the first embodiment. Moreover, the guard electrode in the force sensor of the present disclosure is not limited to that exemplarily described in the first embodiment. The following describes modifications of the guard electrode.

First Modification

Figure 9:
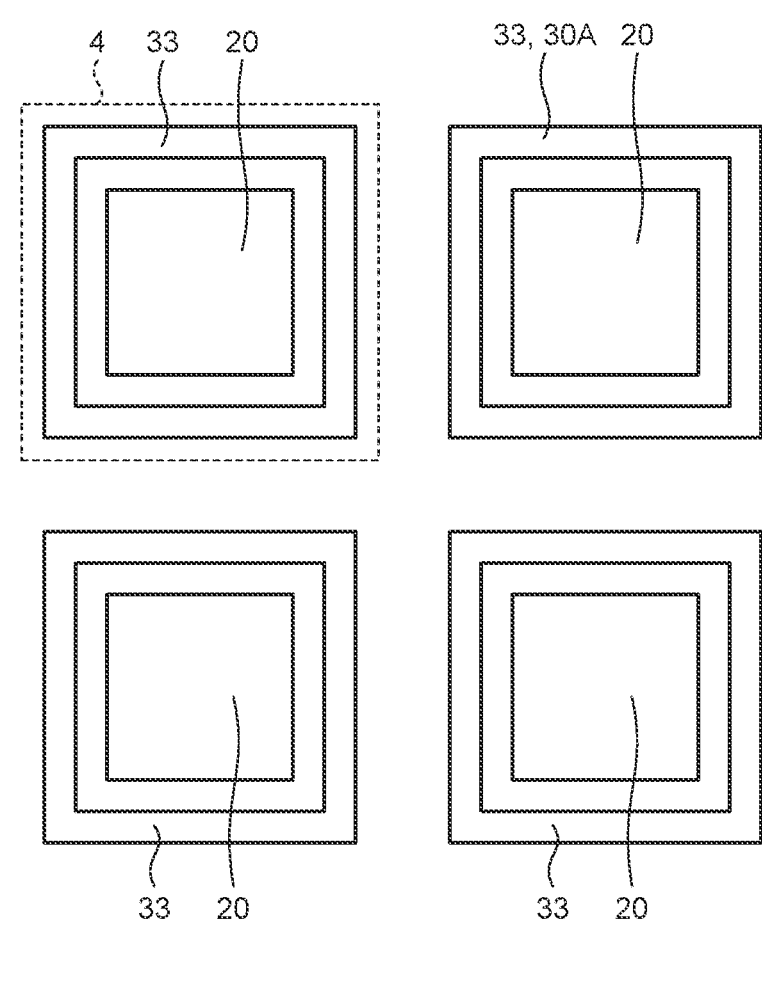
FIG. 9 is a plan view of the array substrate of a force sensor according to a first modification when viewed from the sensor layer.
Figure 9:
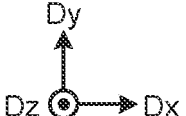

FIG. 9 is a plan view of the array substrate of a force sensor according to a first modification when viewed from the sensor layer. As illustrated in FIG. 9, a guard electrode 30A of the first modification includes annular guard electrodes 33 having an annular shape. Each annular guard electrode 33 has an rectangular frame shape when viewed in the third direction Dz. Each annular guard electrode 33 is positioned inside the corresponding individual detection region 4. The guard electrode 30A of the first modification does not extend to the peripheral region 3. Accordingly, a contact hole is formed through the array layer 10, and a guard electrode wire is provided in the contact hole to supply voltage to the guard electrode 30A. In this manner, according to the first modification, two sides of the respective annular guard electrodes 33 are disposed between the array electrodes 20 adjacent to each other. With this configuration, crosstalk is less likely to occur than with the guard electrode 30 of the first embodiment. In the present disclosure, each annular guard electrode may have a circular frame shape.

Second Modification

Figure 10:
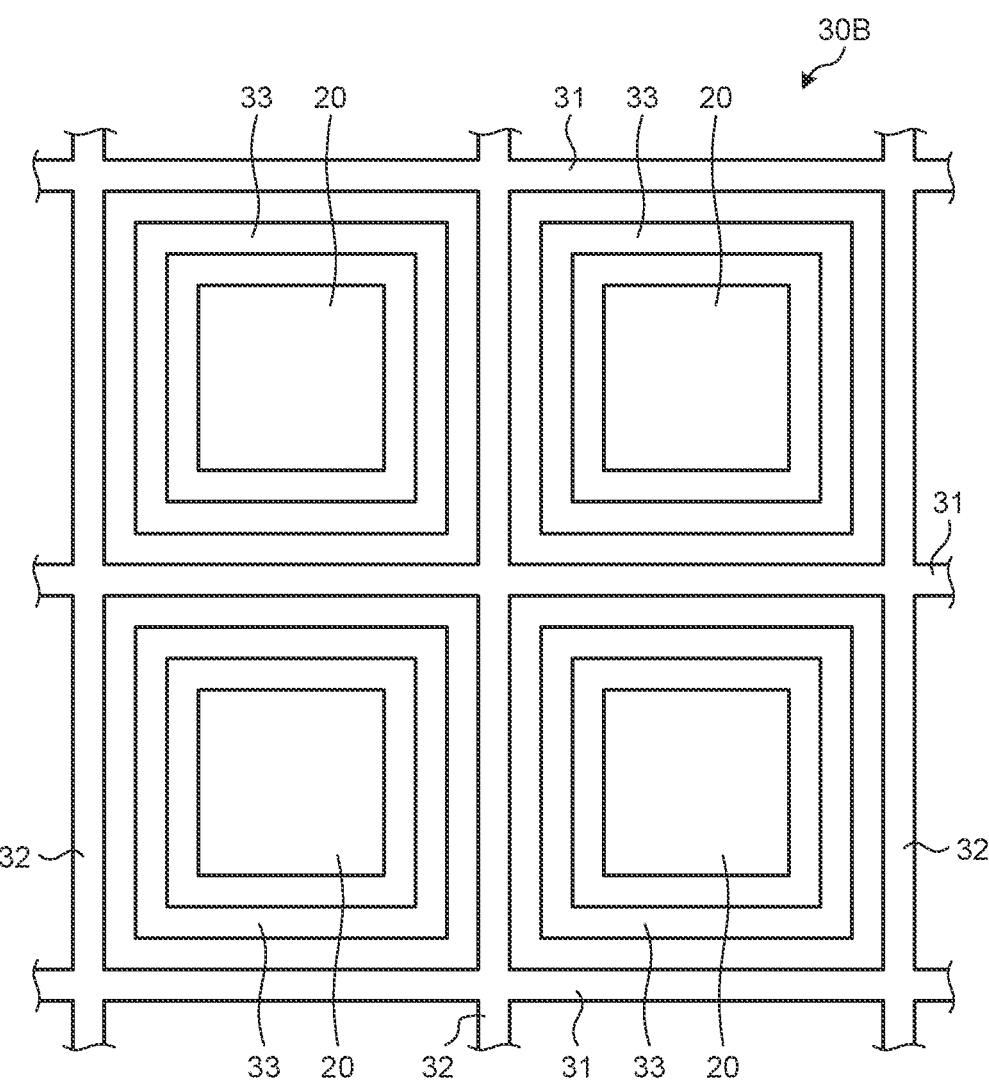
FIG. 10 is a plan view of the array substrate of a force sensor according to a second modification when viewed from the sensor layer.
Figure 10:
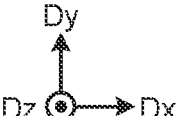

FIG. 10 is a plan view of the array substrate of a force sensor according to a second modification when viewed from the sensor layer. A guard electrode 30B of the second modification includes a plurality of first guard electrodes 31 extending in the first direction Dx, a plurality of second guard electrodes 32 extending in the second direction Dy, and a plurality of annular guard electrodes 33 each having an annular shape. In other words, the guard electrode 30B of the first modification is a combination of the guard electrode 30 of the first embodiment and the guard electrode 30A of the first modification. With this configuration, the occurrence of crosstalk can be further prevented.

Third Modification

Figure 11:
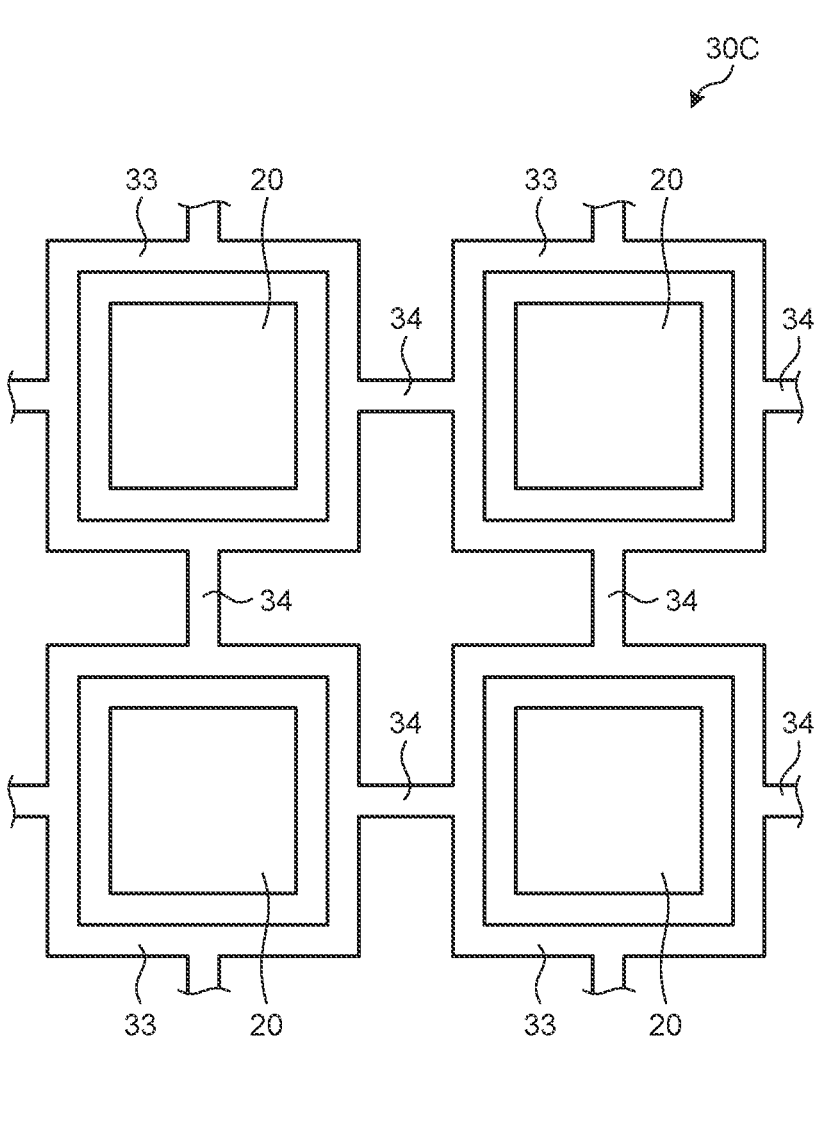
FIG. 11 is a plan view of the array substrate of a force sensor according to a third modification when viewed from the sensor layer.
Figure 11:
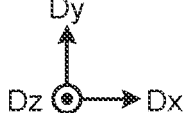

FIG. 11 is a plan view of the array substrate of a force sensor according to a third modification when viewed from the sensor layer. A guard electrode 30C of the third modification includes a plurality of annular guard electrodes 33 and a plurality of coupling guard electrodes 34. Each coupling guard electrode 34 extends in the first direction Dx or the second direction Dy and couples the corresponding annular guard electrodes 33. The coupling guard electrodes 34 also couple the annular guard electrodes 33 to the guard electrode wire (not illustrated) disposed in the peripheral region 3. Thus, according to the third modification, no contact hole needs to be formed through the array layer 10, which leads to easier manufacturing.

Fourth Modification

Figure 12:
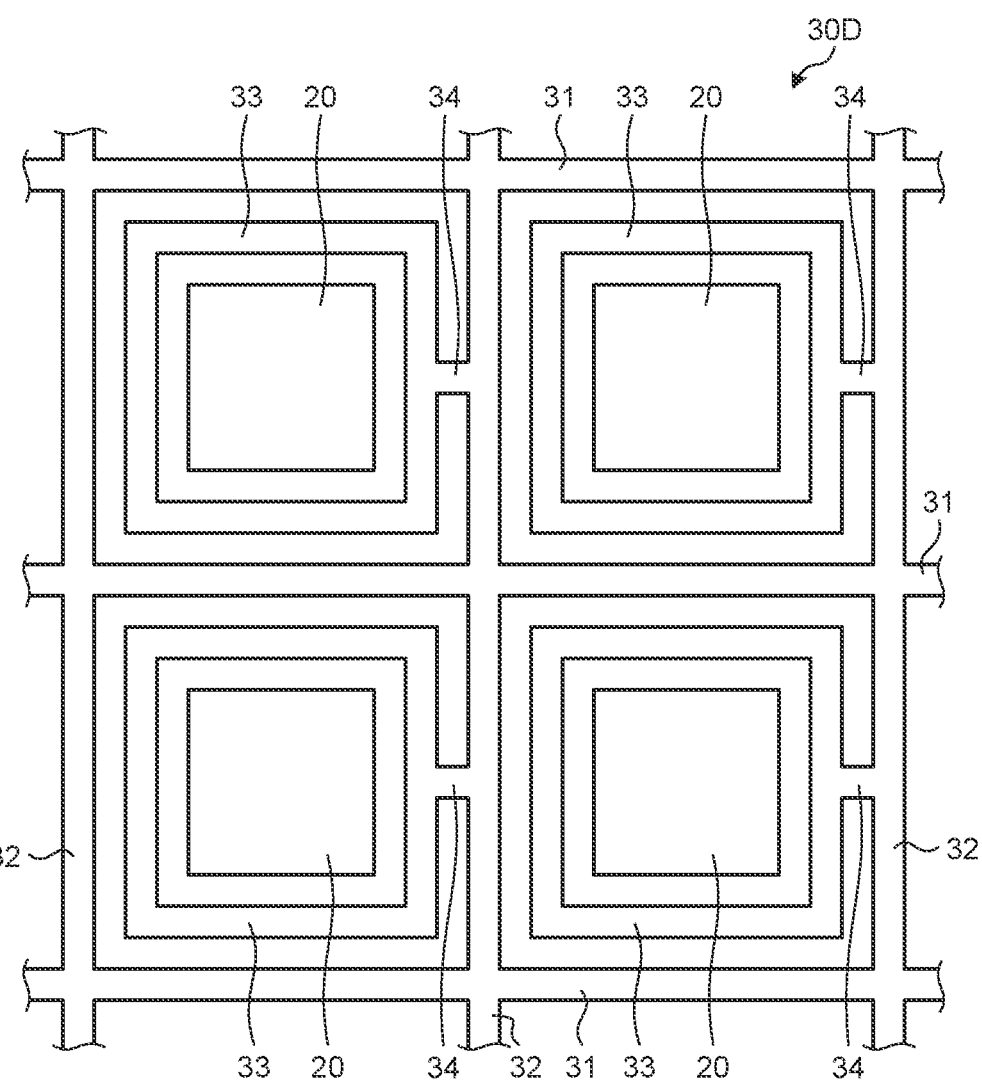
FIG. 12 is a plan view of the array substrate of a force sensor according to a fourth modification when viewed from the sensor layer.
Figure 12:
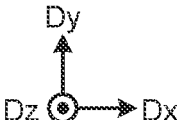

FIG. 12 is a plan view of the array substrate of a force sensor according to a fourth modification when viewed from the sensor layer. A guard electrode 30D of the fourth modification includes a plurality of first guard electrodes 31, a plurality of second guard electrodes 32, a plurality of annular guard electrodes 33, and a plurality of coupling guard electrodes 34. In the fourth modification, each coupling guard electrode 34 couples the corresponding annular guard electrode and the corresponding second guard electrode 32. With this configuration, predetermined voltage is supplied to the annular guard electrode 33 through the first guard electrodes 31. Moreover, no contact hole needs to be formed through the array layer 10, which leads to easier manufacturing.

Fifth Modification

Figure 13:
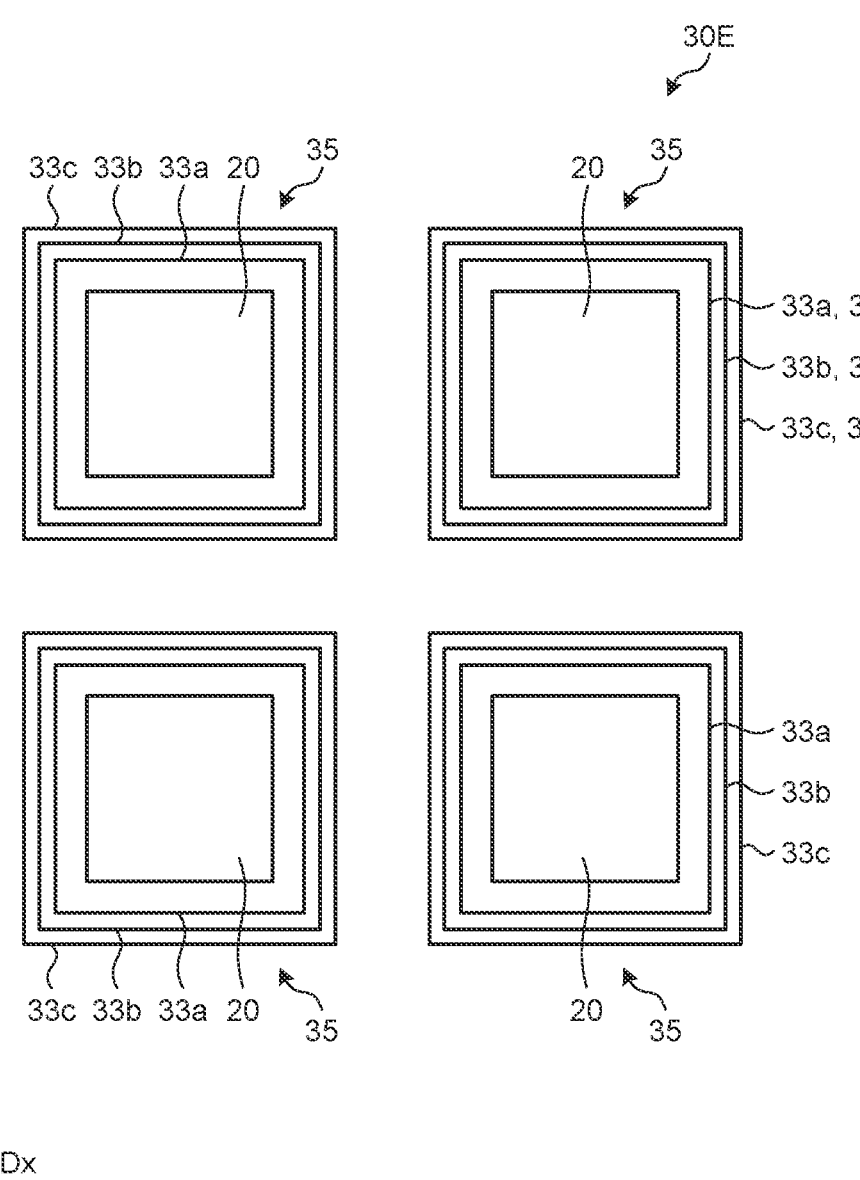
FIG. 13 is a plan view of the array substrate of a force sensor according to a fifth modification when viewed from the sensor layer.

FIG. 13 is a plan view of the array substrate of a force sensor according to a fifth modification when viewed from the sensor layer. A guard electrode 30E of the fifth modification includes multiplex guard electrodes 35. Each multiplex guard electrode 35 includes three (a plurality of) annular guard electrodes 33 centered at the corresponding array electrode 20. Each multiplex guard electrode 35 of the fifth modification has a triplex configuration including a first annular guard electrode 33a surrounding the outside of the corresponding array electrode 20, a second annular guard electrode 33b surrounding the outer periphery side of the first annular guard electrode 33a, and a third annular guard electrode 33c surrounding the outer periphery side of the second annular guard electrode 33b. The widths of the first annular guard electrode 33a, the second annular guard electrode 33b, and the third annular guard electrode 33c are smaller than those of the annular guard electrodes 33 of the first modification. With such a multiplex guard electrode 35, when one of the three annular guard electrodes 33 is broken, the remaining annular guard electrodes 33 function as annular guard electrodes 33.

Sixth Modification

Figure 14:
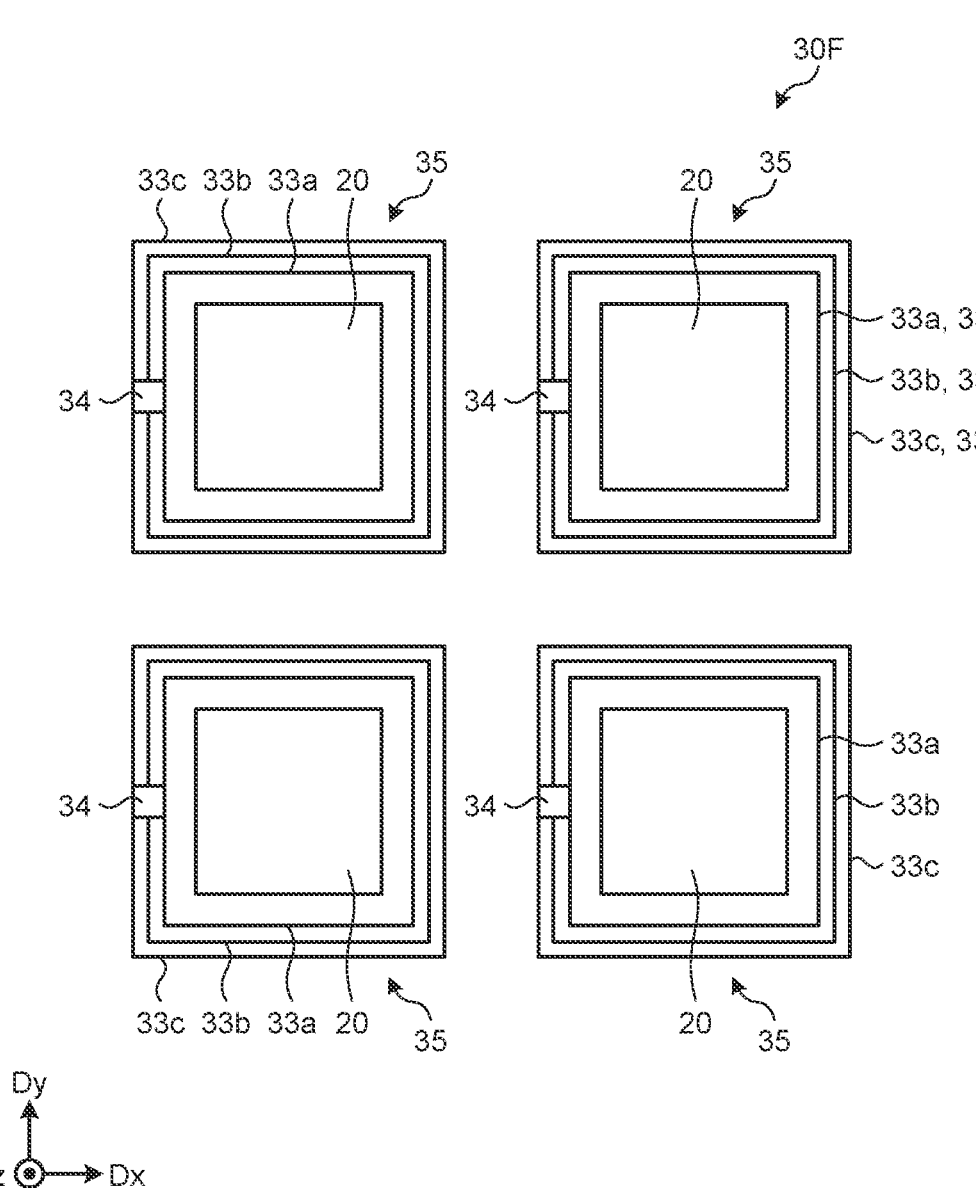
FIG. 14 is a plan view of the array substrate of a force sensor according to a sixth modification when viewed from the sensor layer.

FIG. 14 is a plan view of the array substrate of a force sensor according to a sixth modification when viewed from the sensor layer. A guard electrode 30F of the sixth modification includes a plurality of multiplex guard electrodes 35 and a plurality of coupling guard electrodes 34. Each coupling guard electrode 34 couples the first annular guard electrode 33a, the second annular guard electrode 33b, and the third annular guard electrode 33c of the corresponding multiplex guard electrode 35. Each coupling guard electrode 34 is coupled to the guard electrode wire provided in the contact hole of the array layer 10. According to the sixth modification, no contact hole needs to be formed for each annular guard electrode 33, which leads to easier manufacturing.

The following describes other embodiments of the force sensor of the present disclosure. The description will be made mainly on any difference from the first embodiment.

Second Embodiment

Figure 15:
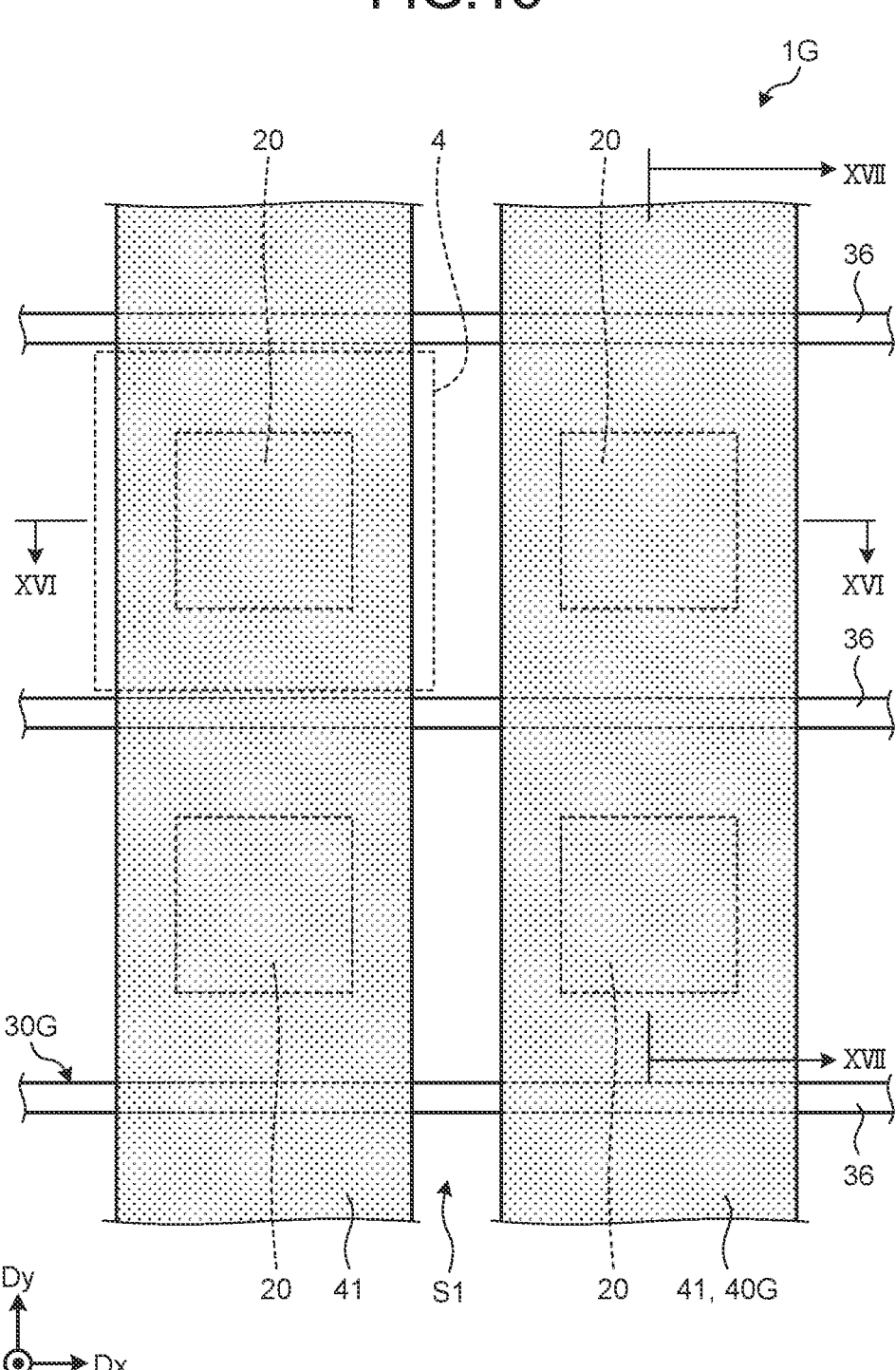
FIG. 15 is a plan view of the array substrate of a force sensor of a second embodiment when viewed from a common electrode.
Figure 16:
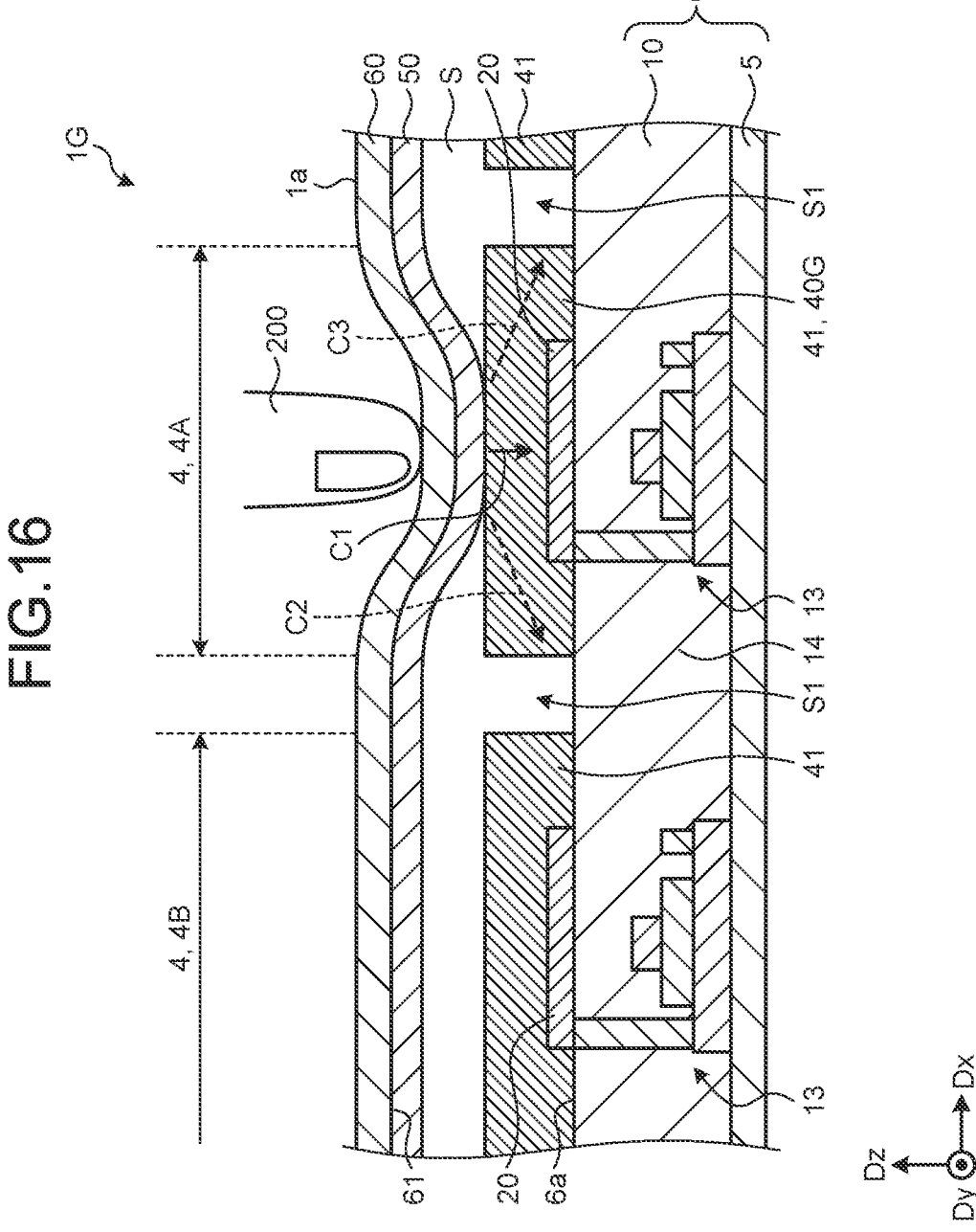
FIG. 16 is a sectional view taken along line XVI-XVI in FIG. 15 when viewed in the direction of arrows, illustrating a state in which the detection surface of the force sensor of the second embodiment is pressed.
Figure 17:
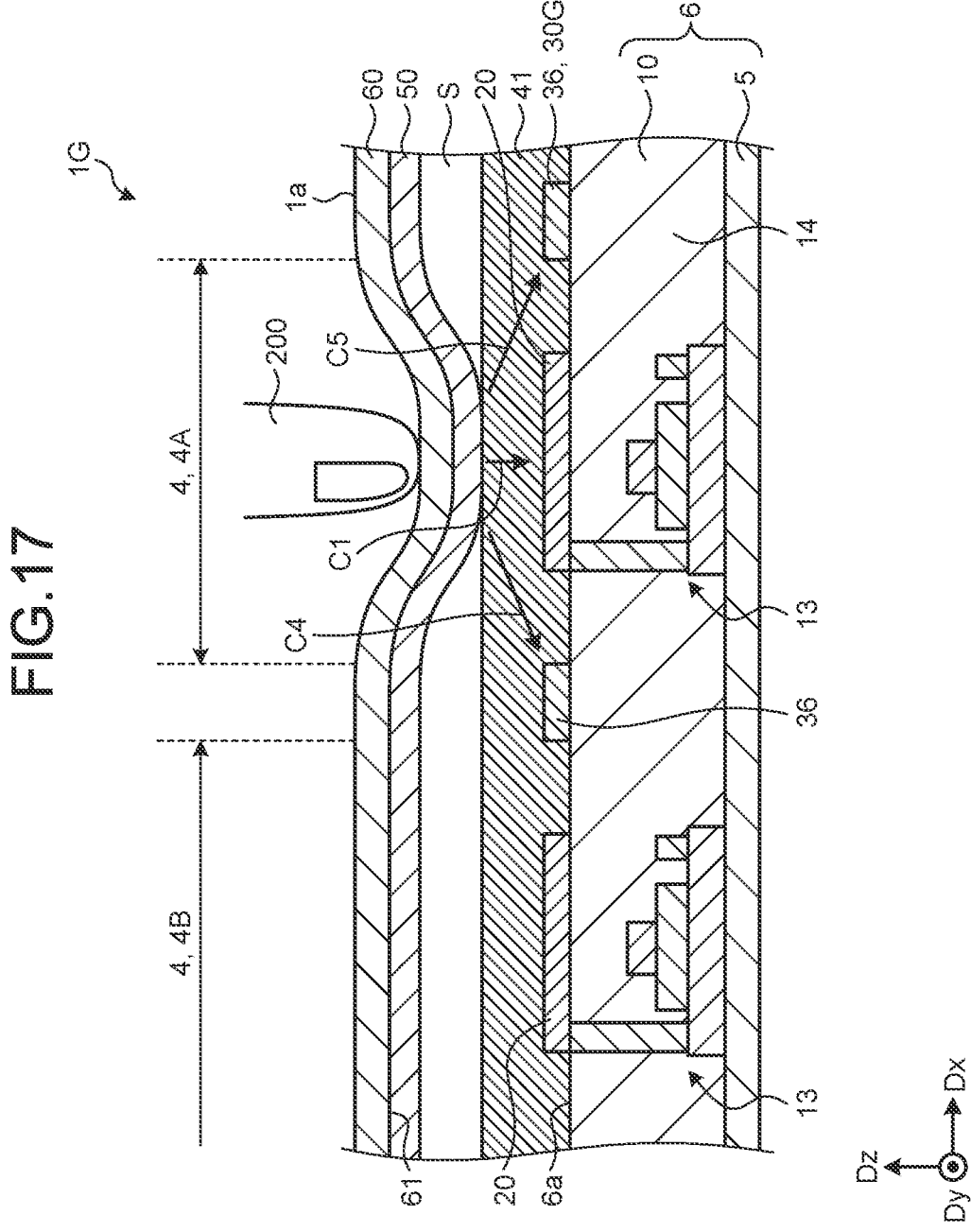
FIG. 17 is a sectional view taken along line XVII-XVII in FIG. 15 when viewed in the direction of arrows, illustrating a state in which the detection surface of the force sensor of the second embodiment is pressed.
Figure 18:
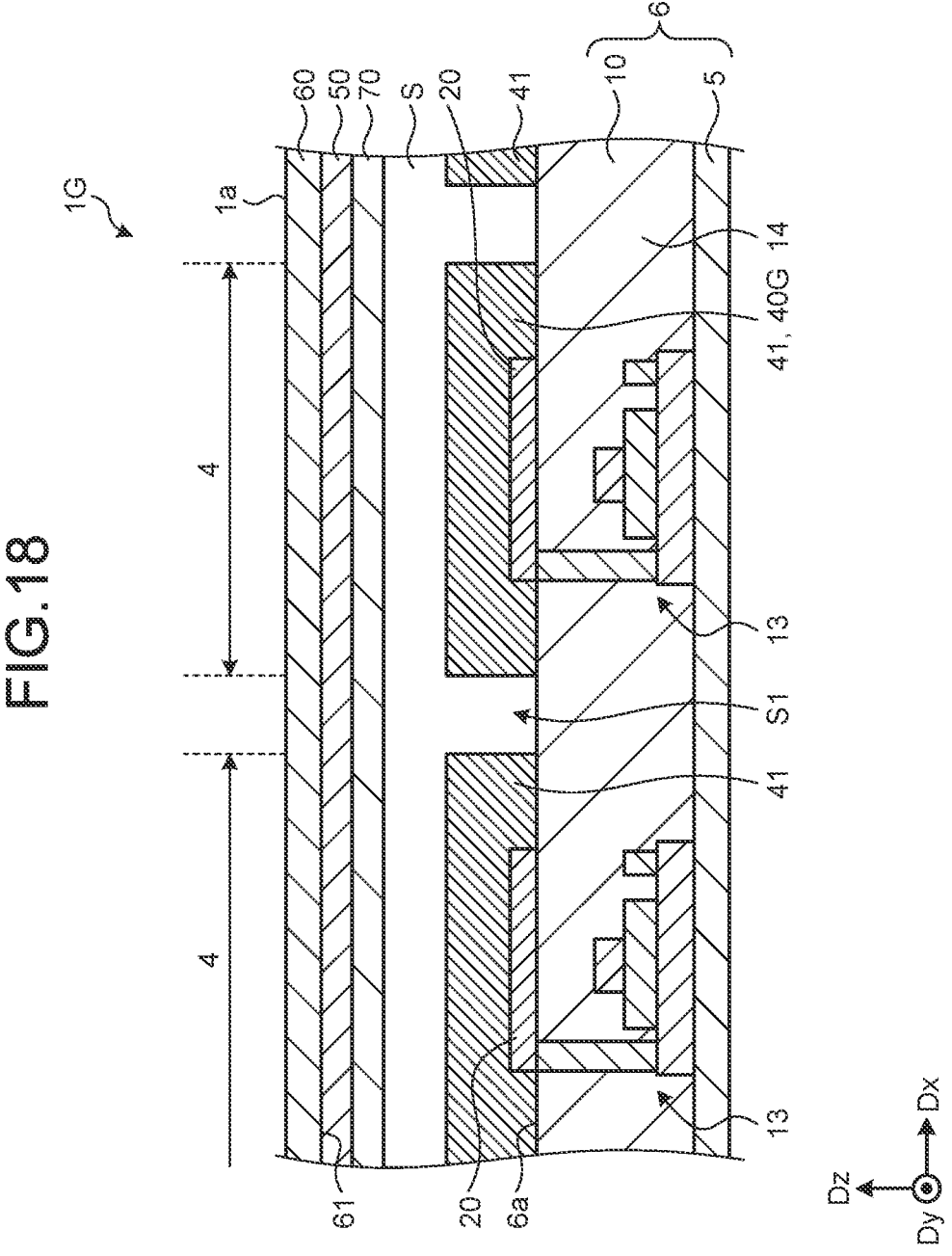
FIG. 18 is a sectional view illustrating a modification of the force sensor of the second embodiment.

FIG. 15 is a plan view of the array substrate of a force sensor of a second embodiment when viewed from the common electrode. FIG. 16 is a sectional view taken along line XVI-XVI in FIG. 15 when viewed in the direction of arrows, illustrating a state in which the detection surface of the force sensor of the second embodiment is pressed. FIG. 17 is a sectional view taken along line XVII-XVII in FIG. 15 when viewed in the direction of arrows, illustrating a state in which the detection surface of the force sensor of the second embodiment is pressed. FIG. 18 is a sectional view illustrating a modification of the force sensor of the second embodiment.

As illustrated in FIG. 15, a force sensor 1G of the second embodiment includes a sensor layer 40G in place of the sensor layer 40, which is a difference from the force sensor 1 of the first embodiment. A force sensor 1H of the second embodiment includes a guard electrode 30G in place of the guard electrode 30, which is another difference from the force sensor 1 of the first embodiment.

The sensor layer 40G includes a plurality of divided sensor layers 41 that are divided in the first direction Dx. Each divided sensor layer 41 extends in the second direction Dy. In other words, each divided sensor layer 41 is placed across the array electrodes 20 arrayed in the second direction Dy. The divided sensor layers 41 are separated from each other. In other words, a gap S1 is provided between the divided sensor layers 41. Accordingly, the divided sensor layers 41 are insulated from each other.

The guard electrode 30G includes a plurality of intersecting guard electrodes 36 extending in the first direction Dx. Each intersecting guard electrode 36 is provided between the array electrodes 20 adjacent to each other in the second direction Dy. Each intersecting guard electrode 36 intersects (is orthogonal to) the divided sensor layers 41 when viewed in the third direction Dz (from the common electrode 50).

According to the force sensor 1G of the second embodiment, when the detection surface 1a is pressed by the finger 200, the common electrode 50 contacts the divided sensor layer 41 in the range of the pressed individual detection region 4A as illustrated in FIG. 16. With this configuration, the array electrode 20 in the pressed individual detection region 4A is electrically coupled to the common electrode 50. Then, current flows from the common electrode 50 to the array electrode 20 (refer to arrow C1 in FIGS. 16 and 17).

As illustrated in FIG. 16, a divided sensor layer 41 different from the divided sensor layer 41 contacting the common electrode 50 is placed over an array electrode 20 adjacent to the array electrode 20 in the pressed individual detection region 4A in the first direction Dx. Accordingly, current hardly flows to the array electrode 20 in the adjacent individual detection region 4B adjacent to the pressed individual detection region 4A in the first direction Dx (refer to dashed line arrows C2 and C3 in FIG. 16).

As illustrated in FIG. 17, an intersecting guard electrode 36 is disposed between the array electrode 20 in the pressed individual detection region 4A and an array electrode 20 adjacent thereto in the second direction Dy. With this configuration, current hardly flows to the array electrode 20 in the adjacent individual detection region 4B adjacent to the pressed individual detection region 4A in the second direction Dy (refer to dashed line arrows C4 and C5 in FIG. 17).

Accordingly, in the force sensor 1G of the second embodiment, crosstalk is prevented by the guard electrode 30G and the divided sensor layers 41.

The force sensor 1G of the second embodiment is described above, but the force sensor of the present disclosure is not limited to the above description. For example, the opposite-side sensor layer 70 may be additionally provided in the force sensor 1G of the second embodiment as illustrated in FIG. 18. The opposite-side sensor layer 70 is a solid film entirely covering the opposite surface 61 and the common electrode 50. The sensitivity of the force sensor of the present disclosure may differ among the divided sensor layers 41. Details thereof will be described in a seventh modification below.

Seventh Modification

Figure 19:
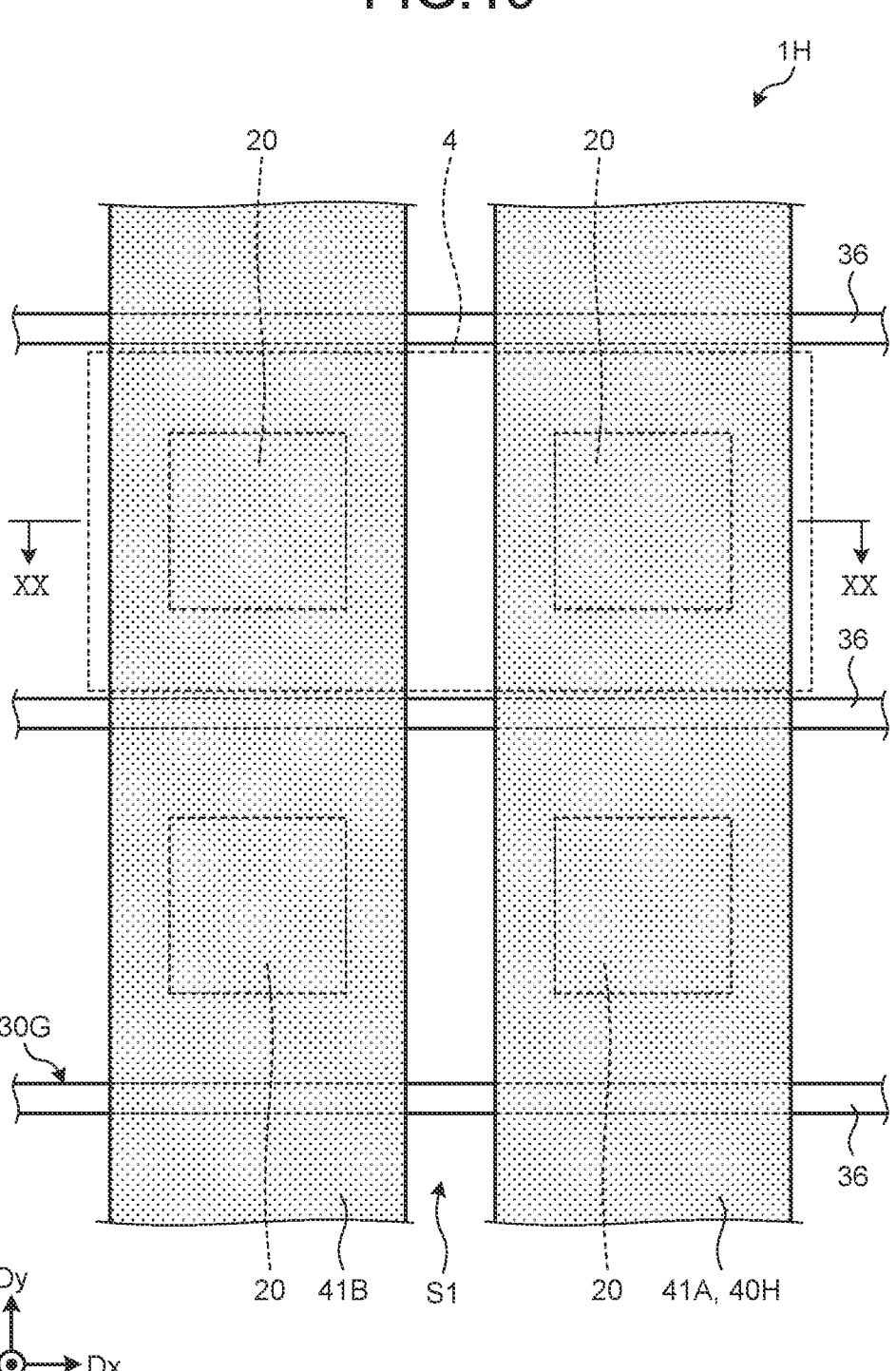
FIG. 19 is a plan view of the array substrate of a force sensor of a seventh modification when viewed from the common electrode.
Figure 20:
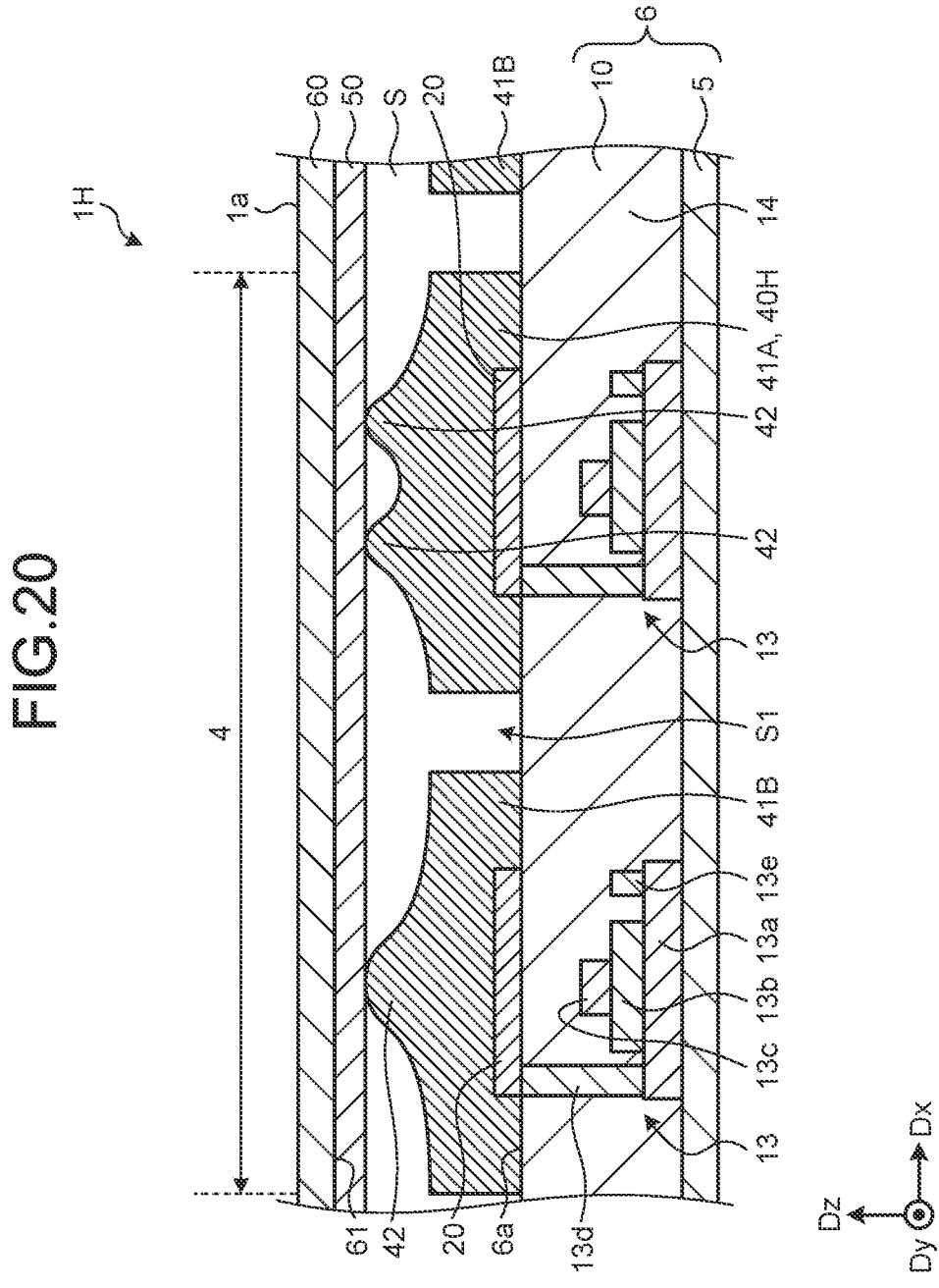
FIG. 20 is a sectional view taken along line XX-XX in FIG. 19 when viewed in the direction of arrows.

FIG. 19 is a plan view of the array substrate of a force sensor of the seventh modification when viewed from the common electrode. FIG. 20 is a sectional view taken along line XX-XX in FIG. 19 when viewed in the direction of arrows. As illustrated in FIG. 19, a sensor layer 40H of a force sensor 1H of the seventh modification includes two kinds of a first divided sensor layer 41A and a second divided sensor layer 41B, which is a difference from the second embodiment. Each individual detection region 4 of the force sensor 1H of the seventh modification is long in the first direction Dx and includes two array electrodes 20, which is another difference from the force sensor 1G of the second embodiment. Accordingly, in the force sensor 1H of the seventh modification, pressing force (force) input to one individual detection region 4 is input to both the first divided sensor layer 41A and the second divided sensor layer 41B.

The first divided sensor layer 41A and the second divided sensor layer 41B are alternately arranged in the first direction Dx. With this configuration, the first divided sensor layer 41A overlaps one of two array electrodes 20 included in one individual detection region 4, and the second divided sensor layer 41B overlaps the other array electrode 20.

As illustrated in FIG. 20, upward protrusions 42 are provided at the first divided sensor layer 41A and the second divided sensor layer 41B. A distal end of each protrusion 42 contacts the common electrode 50. The area of contact of each protrusion 42 and the common electrode 50 is small. With this configuration, the first divided sensor layer 41A and the second divided sensor layer 41B each ensure the state of insulation between the common electrode 50 and the corresponding array electrode 20. However, when the detection surface 1a is pressed and the protrusions 42 collapse (deform), the electric resistances of the first divided sensor layer 41A and the second divided sensor layer 41B decrease. In other words, the first divided sensor layer 41A and the second divided sensor layer 41B change from an insulation state to a conduction state.

The first divided sensor layer 41A is provided with two protrusions 42. The second divided sensor layer 41B is provided with one protrusion 42. Accordingly, in the first divided sensor layer 41A, force applied from the detection surface 1a to the two protrusions 42 is distributed to the protrusions 42. Thus, the second divided sensor layer 41B has a larger change amount upon application of the same force.

In the force sensor 1H of the seventh modification, pressing force (force) input to an individual detection region 4 is input to the first divided sensor layer 41A and the second divided sensor layer 41B. When the pressing force (force) is small, the amount of collapse is insufficient for the two protrusions 42 of the first divided sensor layer 41A, and the insulation state of the first divided sensor layer 41A is held. As a result, no current flows to the array electrode 20 overlapping the first divided sensor layer 41A. However, the amount of collapse is large for the protrusion 42 of the second divided sensor layer 41B, and the second divided sensor layer 41B becomes a conduction state. As a result, current flows to the array electrode 20 overlapping the second divided sensor layer 41B.

When the pressing force (force) input to the individual detection region 4 is large, the two protrusions 42 of the first divided sensor layer 41A are largely collapse and the first divided sensor layer 41A becomes a conduction state. As a result, current flows to the array electrode 20 overlapping the first divided sensor layer 41A. Simultaneously, the protrusion 42 of the second divided sensor layer 41B collapses as well, and current also flows to the array electrode 20 overlapping the second divided sensor layer 41B.

Moreover, in the force sensor 1H of the seventh modification, the sensitivity of force detection can be changed by selecting a signal line 12. Specifically, small force can be detected by selecting a signal line 12 coupled to the array electrode 20 overlapping the second divided sensor layer 41B among the signal lines 12. Large force can be detected by selecting a signal line 12 coupled to the array electrode 20 overlapping the first divided sensor layer 41A among the signal lines 12. Accordingly, the range (dynamic range) of force detection can be increased. Moreover, in the seventh modification as well, current hardly flows to any adjacent array electrode 20 as in the second embodiment. Thus, crosstalk is prevented.

The force sensor 1H of the seventh modification is described above with an example in which the number of protrusions is different between divided sensor layers between which sensitivity is different, but the present disclosure is not limited to the example. For example, a first divided sensor layer and a second division sensor between which hardness is different may be used. Alternatively, a first divided sensor layer and a second division sensor that change from an insulation state to a conduction state as the contact area changes with the magnitude of force may be used. Thus, it suffices that force for change from an insulation state to a conduction state may be different between the divided sensor layers, and the method of causing the difference is not particularly limited. The force sensor of the present disclosure may be the force sensor 1H of the seventh modification to which the opposite-side sensor layer 70 (refer to FIG. 18) as a solid film covering the common electrode 50 is additionally provided. The following describes a force sensor 1I of a third embodiment in which the opposite-side sensor layer 70 is modified.

Third Embodiment

Figure 21:
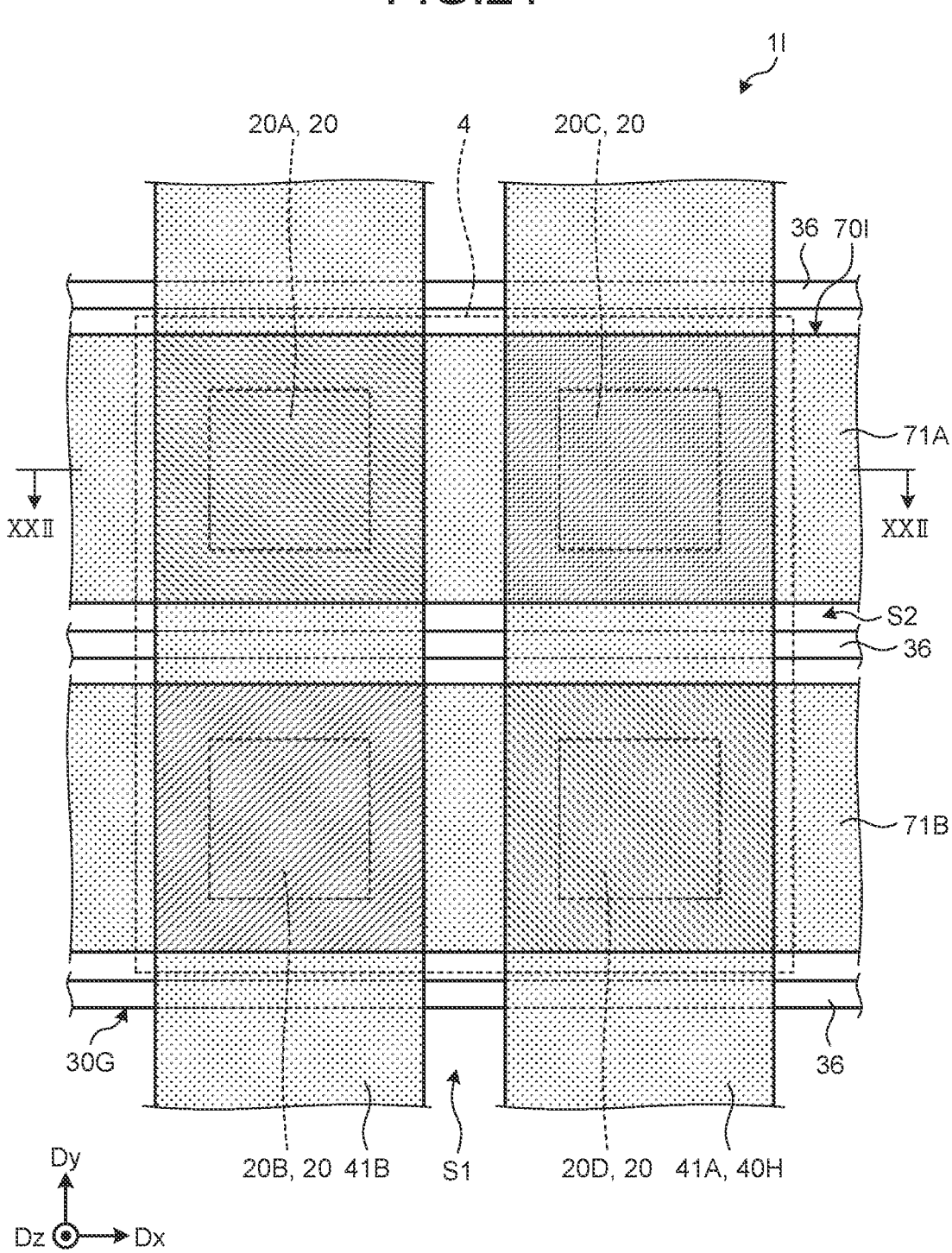
FIG. 21 is a plan view of the array substrate of a force sensor of a third embodiment when viewed from the common electrode.
Figure 22:
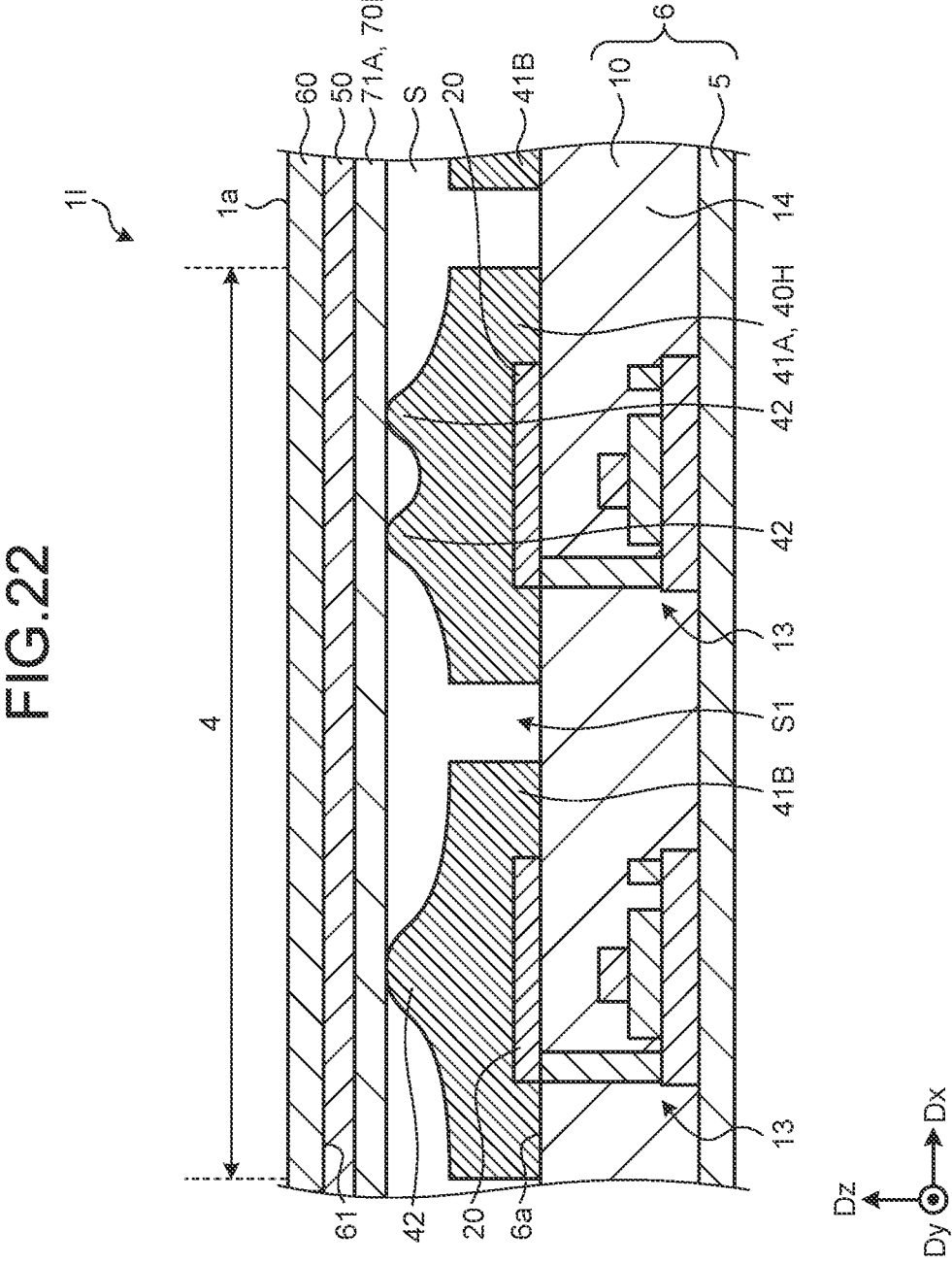
FIG. 22 is a sectional view taken along line XXII-XXII in FIG. 21 when viewed in the direction of arrows.

FIG. 21 is a plan view of the array substrate of the force sensor of the third embodiment when viewed from the common electrode. FIG. 22 is a sectional view taken along line XXII-XXII in FIG. 21 when viewed in the direction of arrows. As illustrated in FIG. 21, an opposite-side sensor layer 701 of the force sensor 1I of the third embodiment includes a plurality of third divided sensor layers 71A and a plurality of fourth divided sensor layers 71B that are alternately arranged in the second direction Dy. In the force sensor 1I of the third embodiment, each individual detection region 4 has a square shape and includes four array electrodes 20, which is a difference from the seventh modification.

Each third divided sensor layer 71A and each fourth divided sensor layer 71B are opposite-side divided sensor layers extending in the first direction Dx. The third divided sensor layer 71A and the fourth divided sensor layer 71B are divided from each other in the second direction Dy. In other words, the third divided sensor layer 71A and the fourth divided sensor layer 71B are separated from each other. In other words, a gap S2 is provided between the third divided sensor layer 71A and the fourth divided sensor layer 71B. Accordingly, the third divided sensor layer 71A and the fourth divided sensor layer 71B are insulated from each other.

As illustrated in FIG. 22, each third divided sensor layer 71A contacts the two protrusions 42 of the first divided sensor layer 41A and the one protrusion 42 of the second divided sensor layer 41B. Although not particularly illustrated, each fourth divided sensor layer 71B contacts the two protrusions 42 of the first divided sensor layer 41A and the one protrusion 42 of the second divided sensor layer 41B.

Rubber that is the parent material of the conductive elastomer as the force sensor 1I is harder and less likely to deform in the third divided sensor layers 71A. In other words, each third divided sensor layer 71A deforms and changes from an insulation state to a conduction state only when force equal to a predetermined value or larger is applied. However, each fourth divided sensor layer 71B deforms and changes from an insulation state to a conduction state upon application of force smaller than the predetermined value. Accordingly, sensitivity is different between the third divided sensor layer 71A and the fourth divided sensor layer 71B. In the present embodiment, the third divided sensor layer 71A and the fourth divided sensor layer 71B have sensitivities different from those of the first divided sensor layer 41A and the second divided sensor layer 41B, respectively.

In the following description, the array electrode 20 overlapping the third divided sensor layer 71A and the second divided sensor layer 41B is referred to as a first array electrode 20A. The array electrode 20 overlapping the fourth divided sensor layer 71B and the second divided sensor layer 41B is referred to as a second array electrode 20B. The array electrode 20 overlapping the third divided sensor layer 71A and the first divided sensor layer 41A is referred to as a third array electrode 20C. The array electrode 20 overlapping the fourth divided sensor layer 71B and the first divided sensor layer 41A is referred to as a fourth array electrode 20D.

The following describes the method of using the force sensor 1 of the third embodiment. The magnitude of inputting to an individual detection region 4 is categorized to four levels, and the force increases in the order of the first level, the second level, the third level, and the fourth level.

According to the force sensor 1I of the third embodiment, when the force input to an individual detection region 4 is at the first level (when the force is extremely small), for example, the third divided sensor layer 71A and the second divided sensor layer 41B deform and become a conduction state. Accordingly, current flows from the common electrode 50 to the first array electrode 20A.

When the force input to an individual detection region 4 is at the second level (when the force is slightly larger), for example, the fourth divided sensor layer 71B and the second divided sensor layer 41B deform and become a conduction state. Accordingly, current flows from the common electrode 50 to the first array electrode 20A and the second array electrode 20B.

When the force input to an individual detection region 4 is at the third level (when the force is further larger), for example, the third divided sensor layer 71A and the first divided sensor layer 41A deform and become a conduction state. Accordingly, current flows from the common electrode 50 to the first array electrode 20A, the second array electrode 20B, and the third array electrode 20C.

When the force input to an individual detection region 4 is at the fourth level (when the force is further larger), for example, the fourth divided sensor layer 71B and the first divided sensor layer 41A deform and become a conduction state. Accordingly, current flows from the common electrode 50 to the first array electrode 20A, the second array electrode 20B, the third array electrode 20C, and the fourth array electrode 20D.

According to the force sensor 1I of the third embodiment, the sensitivity of force detection is divided to four levels. In other words, the range (dynamic range) of force magnitude detection is extended. Accordingly, the magnitude of force to be detected can be set by selecting a plurality of gate lines 11 and a plurality of signal lines 12. Moreover, in the third embodiment as well, current hardly flows to any adjacent array electrode 20 as in the second embodiment, and thus crosstalk is prevented.

What is claimed is:

1. A force sensor comprising:
an array substrate having a first surface provided with a plurality of array electrodes;
a counter substrate having an opposite surface facing the first surface;
a guard electrode disposed on the first surface and extending between the array electrodes;
a sensor layer made of a conductive elastomer and placed over the first surface, the array electrodes, and the guard electrode; and
a common electrode provided on the opposite surface, wherein
the array substrate and the guard electrode are equipotential,
the sensor layer is a solid film entirely covering the first surface, the array electrodes, and the guard electrode,
the array electrodes are arrayed in a first direction parallel to the first surface and in a second direction parallel to the first surface and intersecting the first direction, the guard electrode includes
a plurality of first guard electrodes each extending in the first direction between the array electrodes adjacent to each other in the second direction, and
a plurality of second guard electrodes each extending in the second direction between the array electrodes adjacent to each other in the first direction, and
the array electrodes are disposed inside respective rectangular frames formed by the first guard electrodes and the second guard electrodes.

2. The force sensor according to claim 1, wherein the counter substrate is provided with an opposite-side sensor layer that is a solid film made of a conductive elastomer and entirely covering the opposite surface and the common electrode.

3. The force sensor according to claim 1, wherein
the guard electrode includes a plurality of annular guard electrodes each having an annular shape, and
the array electrodes are disposed inside the respective annular guard electrodes.

4. The force sensor according to claim 3, wherein the counter substrate is provided with an opposite-side sensor layer that is a solid film made of a conductive elastomer and entirely covering the opposite surface and the common electrode.

5. The force sensor according to claim 3, wherein a plurality of the annular guard electrodes are provided around each array electrode.

6. The force sensor according to claim 5, wherein the counter substrate is provided with an opposite-side sensor layer that is a solid film made of a conductive elastomer and entirely covering the opposite surface and the common electrode.

7. A force sensor comprising:
an array substrate having a first surface provided with a plurality of array electrodes;
a counter substrate having an opposite surface facing the first surface;
a guard electrode disposed on the first surface and extending between the array electrodes;
a sensor layer made of a conductive elastomer and placed over the first surface, the array electrodes, and the guard electrode; and
a common electrode provided on the opposite surface, wherein
the array substrate and the guard electrode are equipotential,
the sensor layer is a solid film entirely covering the first surface, the array electrodes, and the guard electrode,
the guard electrode includes a plurality of annular guard electrodes each having an annular shape, and
the array electrodes are disposed inside the respective annular guard electrodes.

8. The force sensor according to claim 7, wherein the counter substrate is provided with an opposite-side sensor layer that is a solid film made of a conductive elastomer and entirely covering the opposite surface and the common electrode.

9. The force sensor according to claim 7, wherein a plurality of the annular guard electrodes are provided around each array electrode.

10. The force sensor according to claim 9, wherein the counter substrate is provided with an opposite-side sensor layer that is a solid film made of a conductive elastomer and entirely covering the opposite surface and the common electrode.

15

11. A force sensor comprising:

an array substrate having a first surface provided with a plurality of array electrodes;

a counter substrate having an opposite surface facing the first surface;

a guard electrode disposed on the first surface and extending between the array electrodes;

a sensor layer made of a conductive elastomer and placed over the first surface, the array electrodes, and the guard electrode; and a common electrode provided on the opposite surface, wherein the array substrate and the guard electrode are equipotential, the sensor layer is a solid film entirely covering the first surface, the array electrodes, and the guard electrode, the array electrodes are arrayed in a first direction parallel to the first surface and in a second direction parallel to the first surface and intersecting the first direction, the sensor layer includes a plurality of divided sensor layers divided in the first direction and extending in the second direction, and the guard electrode includes a plurality of intersecting guard electrodes extending in the first direction and intersecting the divided sensor layers when viewed from the common electrode.

12. The force sensor according to claim 11, wherein the counter substrate is provided with an opposite-side sensor layer that is a solid film made of a conductive elastomer and entirely covering the opposite surface and the common electrode.

13. The force sensor according to claim 11, wherein the divided sensor layers each include a first divided sensor layer and a second divided sensor layer that are alternately arranged in the first direction, and the first divided sensor layer and the second divided sensor layer are different from each other in force for change from an insulation state to a conduction state.

14. The force sensor according to claim 13, wherein the counter substrate is provided with an opposite-side sensor layer that is a solid film made of a conductive elastomer and entirely covering the opposite surface and the common electrode.

15. The force sensor according to claim 13, wherein the counter substrate is provided with an opposite-side sensor layer made of a conductive elastomer and entirely covering the opposite surface and the common electrode, the opposite-side sensor layer is provided with a plurality of opposite-side divided sensor layers divided in the second direction and extending in the first direction, the opposite-side divided sensor layers each include a third divided sensor layer and a fourth divided sensor layer that are alternately arranged in the second direction, and the first divided sensor layer, the second divided sensor layer, the third divided sensor layer, and the fourth divided sensor layer are different from one another in force for change from an insulation state to a conduction state.

* * * * *